United States Patent
Kim et al.

(10) Patent No.: US 9,864,443 B2
(45) Date of Patent: Jan. 9, 2018

(54) METHOD FOR CONTROLLING USER INPUT AND ELECTRONIC DEVICE THEREOF

(71) Applicant: Samsung Electronics Co., Ltd., Gyeonggi-do (KR)

(72) Inventors: Hak-Soo Kim, Gyeonggi-do (KR); Jae-Hyun Kim, Gyeonggi-do (KR); Hyoung-Il Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 287 days.

(21) Appl. No.: 13/955,388

(22) Filed: Jul. 31, 2013

(65) Prior Publication Data
US 2014/0035851 A1    Feb. 6, 2014

(30) Foreign Application Priority Data
Jul. 31, 2012    (KR) .................. 10-2012-0083775

(51) Int. Cl.
G06F 3/041    (2006.01)
G06F 3/0488    (2013.01)
G06F 3/038    (2013.01)
(52) U.S. Cl.
CPC .............. *G06F 3/041* (2013.01); *G06F 3/038* (2013.01); *G06F 3/0488* (2013.01); *G06F 2203/0383* (2013.01)

(58) Field of Classification Search
CPC ........ G06F 3/041; G06F 3/0488; G06F 3/038; G06F 2203/0383
See application file for complete search history.

(56) References Cited

U.S. PATENT DOCUMENTS

| | | | |
|---|---|---|---|
| 2008/0273015 A1 | 11/2008 | Huang et al. | |
| 2010/0299436 A1* | 11/2010 | Khalid et al. | 709/226 |
| 2010/0315333 A1 | 12/2010 | Hsu | |
| 2012/0017147 A1* | 1/2012 | Mark | G06F 1/1639 715/702 |
| 2012/0050183 A1 | 3/2012 | Lee | |
| 2012/0218200 A1* | 8/2012 | Glazer et al. | 345/173 |
| 2012/0240161 A1* | 9/2012 | Kuo | 725/37 |
| 2012/0284635 A1* | 11/2012 | Sitrick et al. | 715/751 |
| 2014/0063055 A1* | 3/2014 | Osterhout et al. | 345/633 |

FOREIGN PATENT DOCUMENTS

| KR | 10-2003-0012815 A | 2/2003 |
|---|---|---|
| KR | 10-0980741 B1 | 9/2010 |

* cited by examiner

*Primary Examiner* — Andrew Sasinowski
(74) *Attorney, Agent, or Firm* — Cha & Reiter, LLC

(57) ABSTRACT

A method and an electronic device thereof for controlling a user input includes detection of a connection of the electronic device and an external display device. An application selected by a user control is executed and an execute image is provided to the external display device. Whether an event for controlling a user input occurs is detected. When the event for controlling the user input occurs, the user input is processed as an input for the selected application being displayed on the external display device.

18 Claims, 21 Drawing Sheets

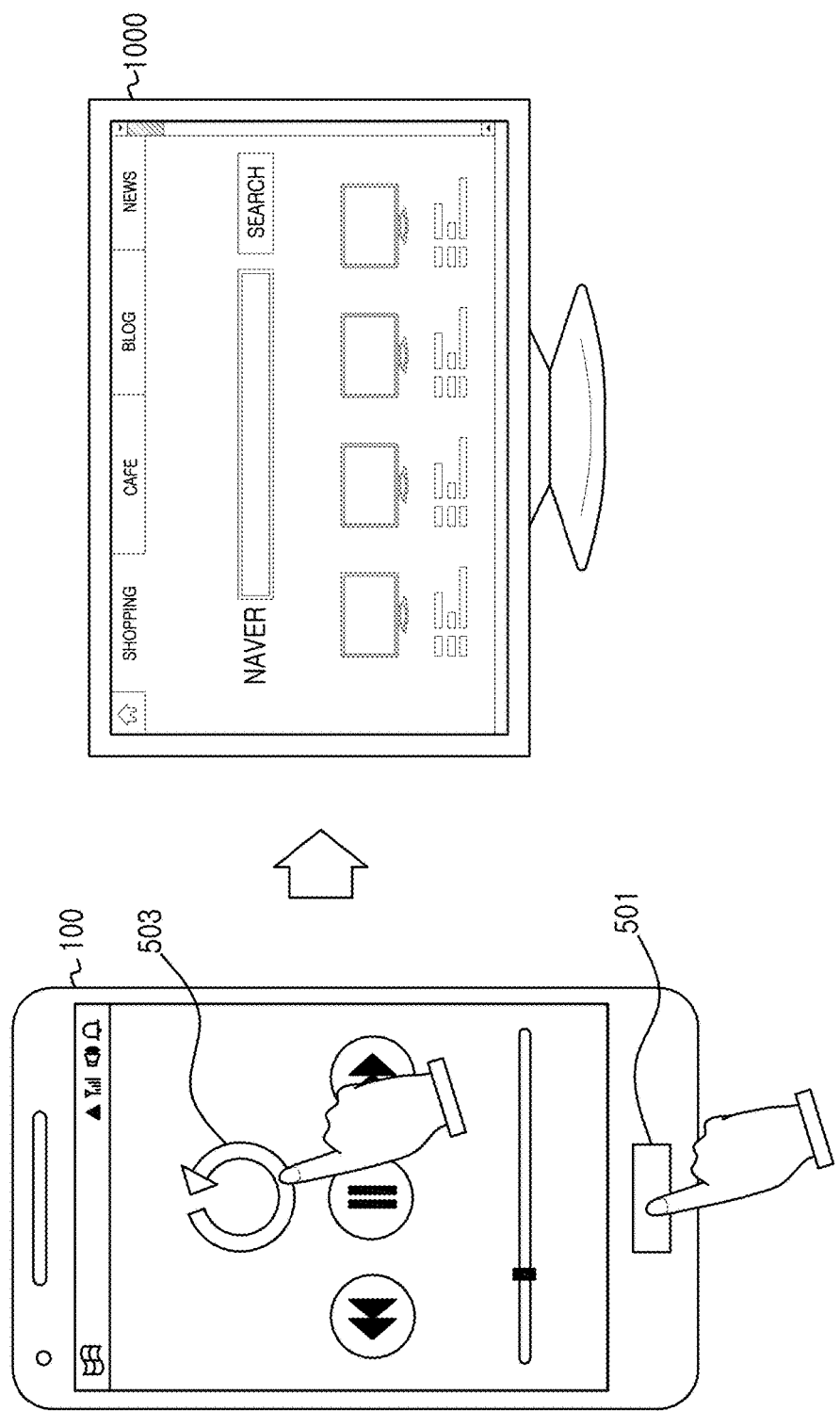

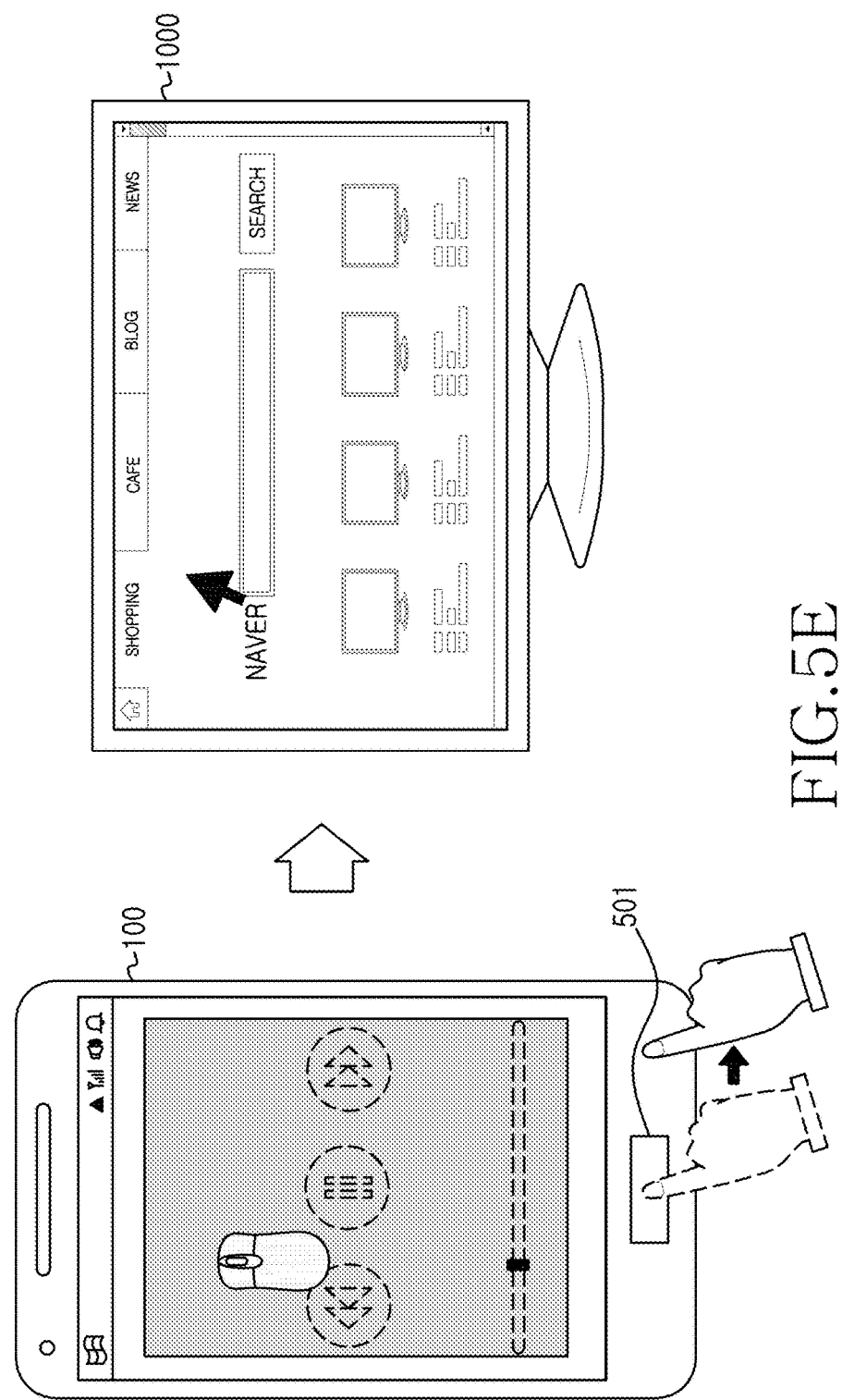

METHOD FOR CONTROLLING USER INPUT AND ELECTRONIC DEVICE THEREOF

CLAIM OF PRIORITY

This application claims the benefit of priority under 35 U.S.C. §119(a) from a Korean patent application filed in the Korean Intellectual Property Office on Jul. 31, 2012 and assigned Serial No. 10-2012-0083775, the entire disclosure of which is hereby incorporated by reference in its entirety.

BACKGROUND

1. Field of the Invention

The present disclosure generally relates to a portable electronic device. More particularly, the present invention relates to a technology for controlling a user input in an electronic device, including but not limited a portable electronic device that is capable of wireless communication.

2. Description of the Related Art

Electronic devices, such as smart phones and a tablet Personal Computer (PC), phablets, etc., have been rapidly developing in recent days. The portable electronic device allowing wireless voice communication and information exchange has become a daily necessity. In early stages of development, portable electronic devices have were originally known as devices enables wireless voice communication, but as a technology thereof continued to develop and wireless Internet was introduced, the portable electronic device has evolved into a multimedia device performing functions of schedule management, games, a remote controller, image shooting, etc., meeting a user's need.

More recently, the portable electronic device provides a function of allowing an image output by execution of an application operating in the portable electronic device and displayed on an external device by connecting/coupling with the external device such as a Television (TV) and a computer. For example, the portable electronic device provides a mirroring function for simultaneously displaying an image that is displayed on the screen of the portable electronic device and on the external device, or an extensive display function for displaying an image on the portable electronic device that is different from an image that is displayed on the external device.

However, the conventional portable electronic device only provides a function that can display an image via the external device and does not provide a technology for controlling a display screen of the external device. Therefore, there is a need in the art to provide a method and apparatus for controlling, at the portable electronic device, a display screen of the external device.

SUMMARY

An aspect of the present invention is to address at least some of the above-mentioned problems and/or disadvantages and to provide at least the advantages described below. Accordingly, an exemplary aspect of the present invention is to provide a method and an apparatus for changing a focus for a user input to one of a portable electronic device and an external device when the portable electronic device displays an image via the external device.

Another exemplary aspect of the present invention is to provide a method and an apparatus for controlling a display screen of an external device when the portable electronic device displays an image via the external device.

Still another exemplary aspect of the present invention is to provide a method and an apparatus for detecting an event for changing a user input focus when a portable electronic device displays an image via an external device, and processing a user input as an input for a display screen of the portable electronic device or as an input for a display screen of the external device.

Yet another exemplary aspect of the present invention is to provide a method and an apparatus for detecting an event for changing a user input focus when a portable electronic device displays an image via an external device, and switching from a display screen control mode of the electronic device to a display screen control mode of the external device.

Yet still another exemplary aspect of the present invention is to provide a method and an apparatus for detecting an event for changing a user input focus when a portable electronic device displays an image via an external device, and allowing the electronic device to operate as an input unit for controlling a display screen of the external device.

In accordance with yet another exemplary aspect of the present invention, a method for controlling a user input in an electronic device, such as a portable electronic device, includes detecting connection of the electronic device and an external display device, executing an application selected by a user control to provide an execute image to the external display device, detecting whether an event for controlling a user input occurs, and when the event for controlling the user input occurs, processing the detected user input as an input for the selected application being displayed on the external display device.

In accordance with still another exemplary aspect of the present invention, a method for controlling a user input in an electronic device, such as a portable electronic device, preferably includes operating in a mode for controlling a display screen of an electronic device, detecting that an external display device is connected to the electronic device, and detecting whether an event for controlling an input occurs. When the event for controlling the input occurs, automatically switching from the mode for controlling the display screen of the electronic device to a mode for controlling a screen of the external display device.

In accordance with still another exemplary aspect of the present invention, an electronic device, such as a portable electronic device, for controlling a user input preferably includes a communication unit for connecting the electronic device with an external display device, a touchscreen, at least one processor, a non-transitory memory, and at least one program comprising machine readable code stored in the memory and executed by the at least one processor, wherein the program includes configures the hardware such as a processor or microprocessor to provide an execute image to the external display device under a user control, detecting whether an event for controlling a user input occurs, and when the event for controlling the user input occurs, processing the user input as an input for the selected application being displayed on the external display device.

In accordance with yet another exemplary aspect of the present invention, an electronic device for controlling a user input is provided. The electronic device preferably includes a communication unit for connecting the electronic device with an external display device, a touchscreen, at least one processor, a non-transitory memory, and at least one program stored comprising machine readable code in the memory and that is executed by hardware such as a process, microprocessor or controller to configure the hardware for operation in a display screen control mode for controlling a display screen of the electronic device, and for detecting that the external display device is connected/coupled to the electronic device, detecting whether an event for controlling a user input occurs, and when the event for controlling the user input occurs, automatically switching from the display screen control mode of the electronic device to an external screen control mode for controlling the screen of the external display device from the electronic device.

Other exemplary aspects, advantages and salient features of the invention will become more apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will become more apparent to a person of ordinary skill in the art from the following description taken in conjunction with the accompanying drawings in which:

FIGS. 5A, 5B, 5C, 5D and 5E are various views illustrating screen configuration for recognizing a button input and a user gesture to change a user input focus in an electronic device according to an exemplary embodiment of the present invention;

Throughout the drawings, like reference numerals will be understood to refer to like parts, components and structures.

DETAILED DESCRIPTION

The following description with reference to the accompanying drawings is provided to assist a person of ordinary skill in the art with a comprehensive understanding of exemplary embodiments of the invention as defined by the claims and their equivalents. The description includes various illustrative details to assist the artisan in that understanding but these are to be regarded as merely exemplary, and do not constitute the only ways the claimed invention can be practiced. Accordingly, those of ordinary skill in the art will recognize that various changes and modifications of the examples described herein can be made without departing from the spirit of the invention and the scope of the appended claims. Also, descriptions of well-known functions and constructions may be omitted for clarity and conciseness when their inclusion could obscure an artisan's appreciation of the subject matter of the present with description of such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustrative purposes only and not for the purpose of limiting the invention as defined by the appended claims and their equivalents.

Exemplary embodiments of the present invention provide a method and an apparatus for changing a user input focus when an electronic device, including but not limited to a portable electronic device, displays an image via an external device and can control the image displayed by the external device from the portable electronic device.

Figure 1A:
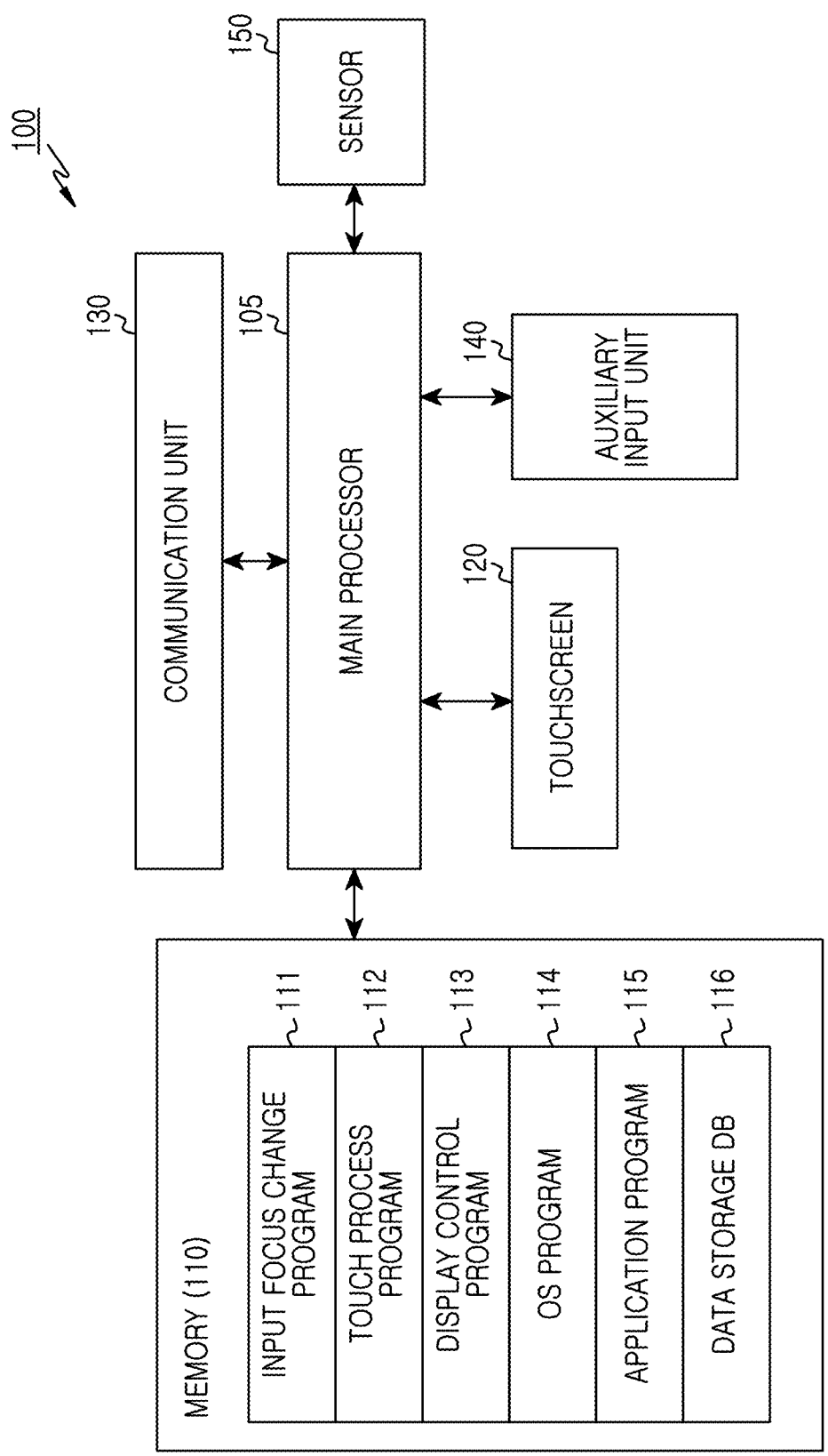
FIG. 1A is a block diagram illustrating an electronic device according to an exemplary embodiment of the present invention.

Here, the electronic device 100 shown in FIG. 1A includes various electronic devices such as a portable terminal, a mobile communication terminal, a smart phone, a Personal Digital Assistant (PDA), a laptop computer, a desktop Personal Computer (PC), a tablet, a phablet, a navigation, a notebook, and any type of wearable communication device, such as electronic goggles, body-borne computer, or wearable smartphone or micro-tablet, etc. Also, the external device includes all electronic devices that can display an image such as a portable terminal, a mobile communication terminal, a smart phone, a PDA, a laptop computer, a desktop PC, a tablet PC, a navigation, a notebook, a Television (TV), etc.

FIG. 1A is a block diagram illustrating an electronic device according to an exemplary embodiment of the present invention.

Referring now to FIG. 1A, the electronic device 100 includes hardware such as a processor 105, a memory 110, a touchscreen 120, a communication unit 130, an auxiliary input unit 140, and a sensor 150.

The processor 105 may include one or more processors (or microprocessors or sub-processor) and a peripheral interface. The processor 105 executes machine executable code to be configured to control and process an overall operation of the electronic device 100. The processor 105 (i.e. main processor) executes machine executable code stored in the non-transitory memory 110 to perform a corresponding function.

When coupled or connected with an external device via a wired line or wirelessly, the processor 105 provides an image by executing a specific application (or app.) to the external device via the wired line or wirelessly to control and process a function for displaying the relevant image on a display device of the external device. More particularly, the processor 105 according to the present invention executes an input focus change program 111 stored in the memory 110, which configures the processor 105 to detect a user input set in advance for changing a user input focus, and controls and processes a function for switching between a mode for controlling a display screen of the electronic device 100 and a mode for controlling a display screen of the external device. Here, the mode for controlling the display screen of the electronic device 100 denotes a mode for processing an input which may be received via the touchscreen 120 as an input for controlling an image executed by the electronic device 100 and output via the touchscreen 120. In contrast, the mode for controlling the display screen of the external device denotes a mode for processing a user input received via the touchscreen 120 as an input for controlling an image executed by the electronic device 100 and output to a display device of the external device (not shown). Also, in the following description, changing an input focus or a user input focus denotes switching between the mode for controlling the display screen of the electronic device 100 and the mode for controlling the display screen of the external device.

The memory 110 stores various types of machine executable code including programs configuring an overall operation of the hardware in electronic device 100, and data. The memory 110 may include at least one of a high speed random access memory such as a magnetic disk storage device, and/or a non-volatile memory, one or more optical storage devices and/or a flash memory (ex: NAND, NOR).

The memory 110 according to the present invention stores the input focus change program 111, a touch process program 112, a display control program 113, an Operating System (OS) program 114, an application program 115, and a data storage DataBase (DB) 116. An artisan should understand and appreciates that in order for functionality any of the machine executable code in the memory is executed by hardware, such as a processor, controller or subprocessor, for operation as described herein.

In the case where the electronic device 100 is displaying an image by execution of a specific application on an external device connected via a wired line or wirelessly, the input focus change program 111 detects a user input for comparison with a user input set in advance for changing an input focus, and then determines whether an input focus change event occurs depending on the comparison result. Here, the user input denotes various data input via the touchscreen 120, the auxiliary input unit 140, or the sensor 150. In other words, when a user touch is detected via the touchscreen 120, the processor 105, which has executed the input focus change program 111, determines whether the detected user touch is a touch of a type set in advance for changing an input focus, so as to determine whether or not an input focus change event occurs. Also, when detecting an input of a specific button provided to the electronic device 100 via the auxiliary input unit 140, the processor 110, which has executed the input focus change program 111 determines whether the input of the specific button is an input of a button set in advance for changing an input focus to determine whether an input focus change event occurs.

The auxiliary input unit, which is preferable but is optional, can include any of a keypad, pointing device, voice recognition unit, etc., just to name a few-non-limiting possibilities.

In addition, when a user gesture or an angle in which the electronic device 100 is tilted, an acceleration, a direction, a pressure, light intensity, etc. of the electronic device 100 is detected via the sensor 150, the input focus change program 111 determines whether detected values meet values set in advance to determine whether the input focus change event occurs. The input focus change program 111 may determine whether the input focus change event occurs using data of different kinds detected at the same time or sequentially detected from the touchscreen 120, the auxiliary input unit 140, and the sensor 150. For example, when detecting a touch of a specific pattern via the touchscreen 120 while sensing that a specific button of the electronic device 100 is pressed via the auxiliary input unit 140, the input focus change program 111 may determine that the input focus change event occurs.

When the input focus change event occurs, the processor 110 which the input focus change program 111, which is executed by the processor controls and processes a function for switching between the mode for controlling the display screen of the electronic device 100 and the mode for controlling the display screen of the external device. In other words, the processor executing the input focus change program 111 provides the OS program 114 also being executed with information that the input focus change event has occurs and controls operation of the OS program 114 to process the user input detected from the touchscreen 120 as one of an input for controlling an image output from the touchscreen 120 of the electronic device and an input for controlling an image output to the display device of the external device.

The processor executing touch process program 112 executes an instruction that configures the processor to control detection whether a touch input of the touchscreen 120 has occurred. In other words, the processor executing the touch process program 112 detects a touch input for a touch sense plane in cooperation with the touchscreen 120. That is, processor executing the touch process program 112 performs determination as to whether a contact (touch) for the touch sense plane is made, a movement of a contact, a movement direction of a contact, a movement time, and whether a contact is stopped. Here, the determination as to the movement of the contact may include determining movement speed (magnitude) of a contact, a movement velocity (magnitude and direction) and/or an acceleration (magnitude and/or direction included), which can be done in conjunction with respective sensor, gyroscope, etc.

The display control program 113 includes various instructions for displaying various graphics on the touchscreen 120. Here, the graphics includes text, a web page, an icon, a digital image, a video, an animation, etc. More particularly, the display control program 113 which is executed by the processor includes an instruction that configures the processor for controlling the display graphics corresponding to a function executed by the processor 105 on the touchscreen 120. Again, a graphics sub-processor could be operating under control of the processor, as one of the exemplary hardware configurations disclosed hereinabove. More particularly, in the case where the electronic device 100 displays an image by execution of a specific application on the external device connected via a wired line or wirelessly, the display control program 112 according to the present invention includes various instructions that configures the processor to control displaying various graphics on the external device. Also, the processor as configured by executing the display control program 112 may provide various instructions for displaying graphics to the touchscreen 120 of the electronic device 100 under control of the OS program 113, and simultaneously provide the instructions to the display device of the external device, or provide the instructions to only one of the touchscreen 120 of the electronic device 100 and the display device of the external device.

The OS program 114 (for example, WINDOWS, LINUX, Dawin, RTXC, UNIX, OS X, or a built-in operating system such as VxWorks) that is executed by the processor includes various software elements for controlling a general system operation. For example, control of the general system operation denotes memory management and control, storage hardware (device) control and management, power control and management, application execution control, display control of an external display device connected via a wired line or wirelessly, etc. The processor as configured by the OS program 114 controls an operational mode of the electronic device to be one of the mode for controlling the display screen of the electronic device 100, or the mode for controlling the display screen of the external device according to a request of the input focus change program 111 that is executed by the processor. While operating in the mode for controlling the display screen of the electronic device 100, the processor executing the OS program 114 processes a touch input from the touch process program 112 and an input from the auxiliary input unit 140 as an input for controlling a user interface being output to the touchscreen 120 of the electronic device 100. In other words, the processor executing the OS program 114 determines a detected user input as an input for contents, an application, or a window currently being displayed on the touchscreen 120, and performs a control and a process for executing a function corresponding to the touch. In contrast, while operating in the mode for controlling an image output to the display screen of the external device, the processor executing the OS program 114 processes a touch input from the touch process program 112 and an input from the auxiliary input unit 140 as an input for controlling a user interface being output to the display device of the external device. In other words, the processor executing the OS program 114 determines the user input as an input for contents, an application, or a window being displayed on the display device of the external device, and performs a control and a process for executing a function corresponding to the touch.

The application program 115 when executed by the processor includes items and functions such as a browser, an e-mail, a message, word processing, an address book, a widget, Digital Right Management (DRM), voice recognition, voice duplication, a position determining function, a location based service, and a multimedia and image viewer application for reproducing a moving picture and music.

Also, the memory 110 includes the data storage database (DB) 116. The data storage DB 116 is a DB for storing various data required for an operation of the electronic device 100, and may store at least one condition for occurrence of an input focus change event. Here, the input focus change event occurrence condition may include various data or combination of these data input via the touchscreen 120, the auxiliary input unit 140, or the sensor 150. For example, the input focus change event occurrence condition may be set using specific button pressing, a touch of a specific pattern, a specific icon touch, specific text input, a specific gesture or gestures, an angle (or slope) within a threshold range at which the electronic device is tilted (oriented, etc.), an acceleration within a threshold range, a specific direction, a pressure within a threshold range, and light intensity within a threshold range, a voice command, or using a combination of two or more of these. Here, the input focus change event occurrence condition may be differently set depending on a design scheme and it is obvious that the input focus change event occurrence condition may be set and changed depending on a user's control.

The touchscreen 120 is a touch-sensitive display and provides an interface for an input and an output between the electronic device 100 and the user. More particularly, the touchscreen 120 is a medium for detecting the user's touch (contact) for a touch plane to transfer the same to the electronic device 100, and displaying an output from the electronic device to provide the same to the user. More particularly, the touchscreen 120 provides a visual output based on text, graphics, and a video to the user in response to a touch input. For the touchscreen 120, various display technologies such as a Liquid Crystal Display (LCD), a Light Emitting Diode (LED), a Light Emitting Polymer Display (LPD), an Organic Light Emitting Diode (OLED), an Active Matrix Organic Light Emitting Diode (AMO-LED), or a Flexible LED (FLED), etc. may be used. The touchscreen 120 of the present invention is not limited to a touchscreen that uses these display technologies. Also, the touchscreen 120 may detect start of a contact, movement of a contact, or stoppage or end of a contact for a touch sense plane using various touch detecting (or sensing) technologies such as capacitive detection, resistive detection, infrared detection, and surface acoustic wave detection technology, just to name some non-limiting possibilities. The touchscreen 120 according to the present invention detects one or more touches from the user and detects a release of a touch. A touch detected by the touchscreen 120 may be a tap, a tap for a predetermined time, and a gesture such as a double tap or a drag. Also, "near touch", where a stylus or a finger comes within a predetermined distance of the touchscreen, is also to be considered a touch or tap that is detected by the touch screen.

The communication unit 130, which comprises hardware such as a transceiver, performs a function for transmitting/receiving a signal to/from an external device via a wired line or wirelessly. In other words, the communication unit 130 may include a Radio Frequency (RF) transceiver and/or a light (for example, infrared) transceiver, or an optical cable, etc. For example, the communication unit 130 may include a wireless transceiver supporting one or more of a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, WiMax network, and/or a Bluetooth network. According to an exemplary embodiment of the present invention, a network supported by the communication unit 130 is not limited to the above networks but may support a other types of networks or protocols, for example NFC. Peer-to-peer communication can also be performed via the communication unit in an exemplary embodiment of the present invention.

The auxiliary input unit 140 denotes various input units other than the touchscreen 120, providing a user input to the electronic device 100. For example, the auxiliary input unit 140 may include various input units such as up/down buttons for controlling a volume, a home button for moving to a home screen, a lock button for locking and releasing a screen, a stylus pen, etc. The auxiliary input unit 140 could also comprise a touch input unit, voice recognition unit, etc.

The sensor 150 can comprise various sensors for collecting information of the electronic device 100 or information of the neighborhood of the electronic device 100. For example, the sensor 150 may include at least one of a motion sensor for sensing a user's gesture (or motion), an acceleration sensor for measuring an acceleration of the electronic device 100, an angle sensor for measuring an angle (or slope) of the electronic device 100, a pressure sensor for measuring a pressure applied to the electronic device 100, and/or a light sensor for sensing light.

Figure 1B:
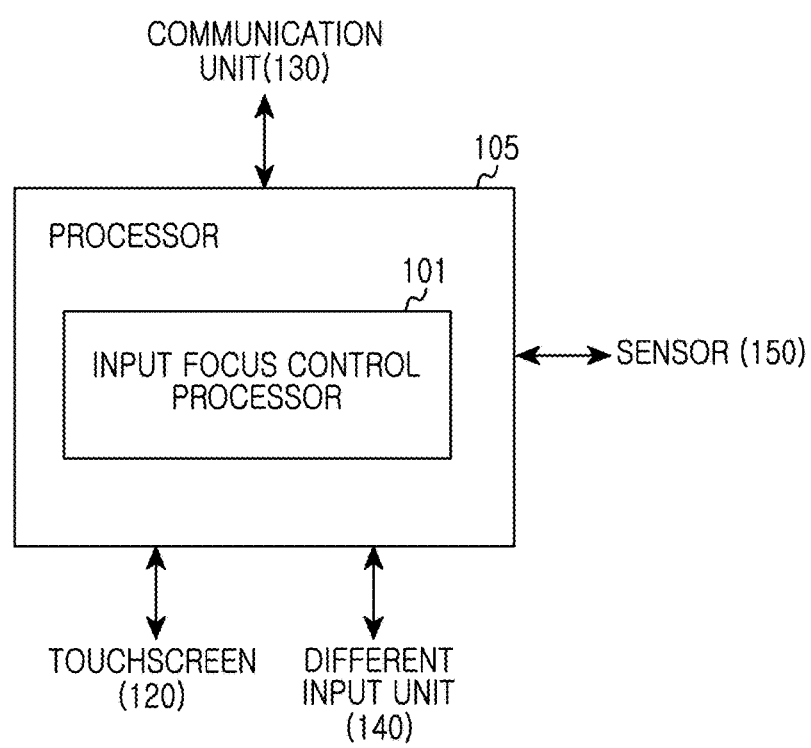
FIG. 1B is a block diagram illustrating a processor of an electronic device according to an exemplary embodiment of the present invention.

FIG. 1B is a block diagram illustrating a processor of an electronic device 100 according to an exemplary embodiment of the present invention.

Referring now to FIG. 1B, the processor 105 includes an input focus control processor 101. The input focus control processor 101 can be, for example a sub-processor of processor 105.

When coupled/connected with an external device via a wired line or wirelessly, the input focus control processor 101 provides an image by execution of a specific application to the external device via the wired line or wirelessly to control and process a function for displaying the relevant image on the display device of the external device. Particularly, the input focus control processor 101 according to the present invention is configured to detect a user input set in advance for changing an input focus, and switches modes between the mode for controlling the display screen of the electronic device 100 and the mode for controlling the display screen of the external device to process a touch input received from the touchscreen 120 according to the mode in operation. While operating in the mode for controlling the display screen of the electronic device 100, the input focus control processor 101 processes a touch input from the touchscreen 120 and an input from the auxiliary input unit 140 as an input for controlling a user interface being output to the touchscreen 120 of the electronic device 100. In other words, the input focus control processor 101 determines a user input as an input for contents, an application, or a window currently being displayed on the touchscreen 120, and performs a control and a process for executing a function corresponding to the touch. In contrast, while operating in the mode for controlling an image output to the display device of the external device, the input focus control processor 101 processes a touch input from the touch process program 112 and an input from the auxiliary input unit 140 as an input for controlling a user interface being output to the display device of the external device. In other words, the input focus control processor 101 determines an input, such as a user input, as an input for contents, an application, or a window being displayed on the display device of the external device, and performs a control and a process for executing a function corresponding to the touch. Here, the input focus change event occurrence condition may include various data or combination of these data input via the touchscreen 120, the auxiliary input unit 140, or detected by the sensor 150. For example, the input focus change event occurrence condition may be set using specific button pressing, a touch of a specific pattern, a specific icon touch, specific text input, a specific gesture, a specific direction, an angle (or slope) within a threshold range, an acceleration within a threshold range, a pressure within a threshold range, and light intensity within a threshold range, or may be set using a combination of two or more of these. Here, the input focus change event occurrence condition may be differently set depending on a design scheme and it is obvious that the input focus change event occurrence condition may be set and changed depending on a user's control.

Figure 2A:
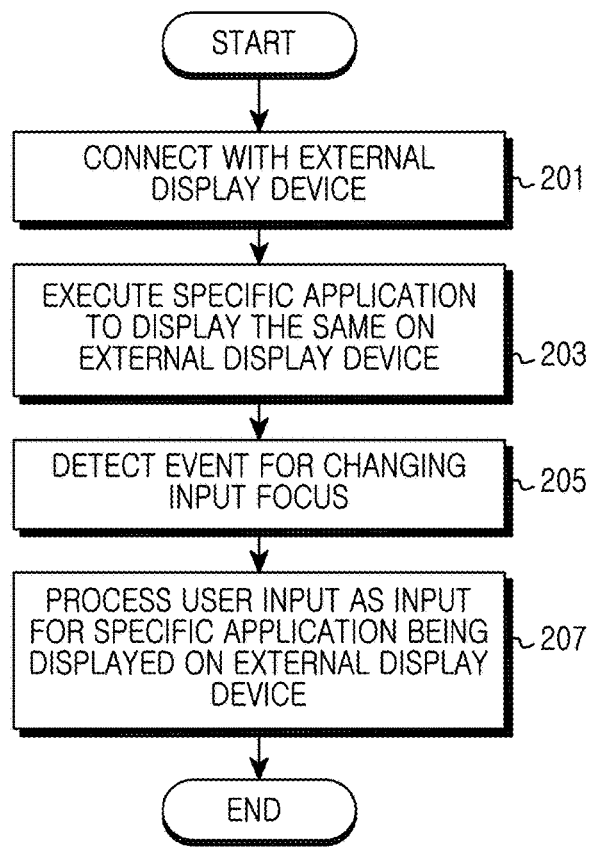
FIG. 2A is a flowchart illustrating a procedure for changing a user input focus in an electronic device according to an exemplary embodiment of the present invention.

FIG. 2A illustrates a procedure for changing a user input focus in an electronic device 100 according to an exemplary embodiment of the present invention.

Referring now to FIG. 2A, at S201 the electronic device 100 connects with an external device via a wired line or wirelessly. While the examples herein envision a direct connection, the present invention is broad and the connection could be via an Access Point (AP) as well.

At S203, a processor of the electronic device 100 executes a specific application under a user control or according to a predetermined method to display the same on a display device (referred to as an 'external display device' hereinafter) of the external device. In other words, the electronic device 100 via hardware such as the processor executes an application determined by user selection or a predetermined application for the external device, and transmits images (referred to as 'execute images' hereinafter) representing a user interface of the executed application, an operation and a result of the application to the external device in real-time to request the external device to display the relevant execute images in real-time. At this point, the electronic device 100 may execute a different application to display execute images of the different application on the touchscreen of the electronic device 100.

At S205, the electronic device 100 detects an event for changing a user input focus. Here, the event for changing the user input focus may be set using one of specific button pressing, a touch of a specific pattern, a specific icon touch, specific text input, a specific gesture, a specific direction, an angle (or slope) within a threshold range, an acceleration within a threshold range, a pressure within a threshold range, and light intensity within a threshold range, or may be set using a combination of two or more of these.

At S207, the electronic device 100 processes a user input as an input for a specific application being displayed on the external display device in step 207. In other words, when detecting an event for changing the user input focus while processing a user input detected via the touchscreen 120 as an input for an application being displayed on the touchscreen, the electronic device 100 processes the user input detected via the touchscreen 120 as an input for a specific application being displayed on the external display device.

More particularly, the electronic device 100 detects an event for changing a user input focus to automatically switch between a mode for controlling a screen displayed on the display device (the touchscreen 120) of the electronic device 100 and a mode for controlling a screen displayed on the external display device. Hereinafter, for convenience in description, the mode for controlling the screen displayed on the display device (the touchscreen 120) of the electronic device 100 is referred to as a "display device control mode of the electronic device", and the mode for controlling the screen displayed on the external display device is referred to as an "external display device control mode".

Figure 2B:
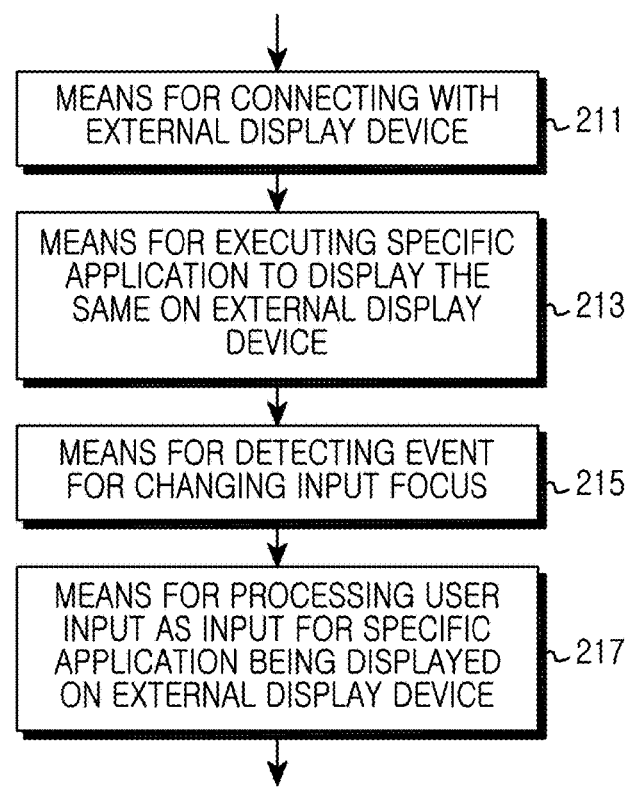
FIG. 2B is a view illustrating means for changing a user input focus in an electronic device according to an exemplary embodiment of the present invention.

FIG. 2B illustrates means for changing a user input focus in an electronic device 100 according to an exemplary embodiment of the present invention.

As illustrated in FIG. 2B, the electronic device 100 includes means 211 for connecting with an external device via a wired line or wirelessly which includes such structure as a transceiver or separate transmitter and receiver, and means 213 for executing a specific application (which includes hardware such as a processor, microprocessor, sub-processor or controller) under a user control or according to a predetermined method and displaying the same on an external display device. Also, the electronic device 100 includes means 215 for detecting an event for changing a user input focus (which includes structure such as a touchscreen or auxiliary input), and means 217 for processing a user input, such as a processor for processing an input for a specific application being displayed on the external display device.

Figure 3:
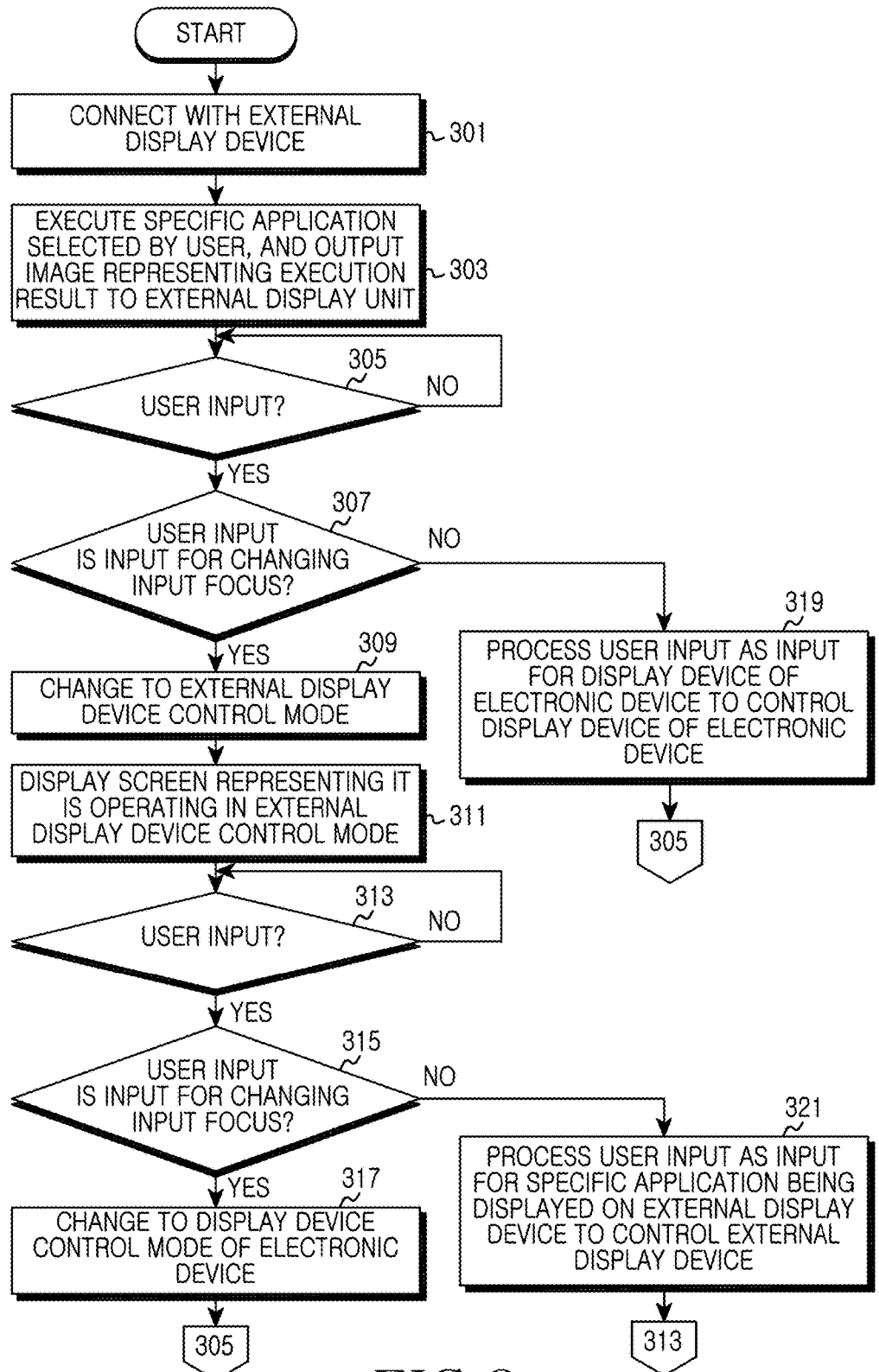
FIG. 3 is a flowchart illustrating exemplary operational procedure for changing a user input focus in an electronic device according to an exemplary embodiment of the present invention.

FIG. 3 illustrates a detailed exemplary operational procedure for changing a user input focus in an electronic device 100 according to an exemplary embodiment of the present invention.

Referring now to FIG. 3, at S301, the electronic device 100 connects with an external device via a wired line or wirelessly.

At S303, the processor executes a specific application selected by a user control, and outputs an execute image to an external display device. In other words, the electronic device 100 via the processor executes an application determined by user selection, transmits images representing a user interface of the executed application, an operation and a result of the application, execute images to the external display device in real-time to request the external display device to display the relevant execute images in real-time. At this point, the electronic device 100 may display, for example, on the touchscreen 120 the execute images transmitted to the external display device on the touchscreen 120, and/or may execute a different application to display execute images of the different application on the touchscreen 120 of the electronic device 100. In other words, in this example the device 100 can display on its touch screen the images transmitted to the external device, or can another (e.g. different) application and display items associated with this different application while the external display device is displaying the execute images transmitted and controlled by the electronic device.

At S305t, the electronic device 100 determines whether a user input occurs. Here, the term "user input" denotes any type of input exerted on the electronic device 100 under a user control. For example, the user input includes all of a touch input (including "near-touch" as discussed herein above) detected via the touchscreen 120, a button input detected via the auxiliary input unit 140, a user gesture, an angle, an acceleration and a direction of the electronic device 100 sensed via the sensor 150, a pressure and light intensity exerted on the electronic device 100, or voice recognition.

At 307, after a user input occurs at S305, the electronic device 100 determines whether or not the occurred user input comprises an input for changing a user input focus. In other words, the electronic device 100 determines whether or not the occurred user input comprises an input for changing the user input focus set in advance by a designer and a user. Here, the input for changing the user input focus set in advance may be set using one of specific button pressing, a touching in a specific pattern, a specific icon touch, specific text input, a specific gesture, a specific direction, a specific spoken command, detection of an angle within a threshold range, an acceleration within a threshold range, a pressure within a threshold range, and light intensity within a threshold range, or may be set using a combination of two or more of these non-limiting examples.

In the case at S307 where the occurred user input is not an input for changing the user input focus, the electronic device 100 then next performs S319 to process the occurred user input as an input for the display device (the touchscreen 120) of the electronic device to control the display device of the electronic device. In other words, the electronic device 100 processes the user input detected (or sensed) via the touchscreen 120, the auxiliary input unit 140, and the sensor 150 as an input for an application being displayed on the touchscreen.

In contrast, in the case at S307 where the occurred user input is an input for changing the user input focus, the electronic device 100 performs S309 to change from the mode for controlling the display device (the touchscreen 120) of the electronic device 100 to the external display device control mode.

At S311, the electronic device displays an image, a message, or an icon representing that the electronic device 100 is operating in the external display device control mode on the touchscreen 120 of the electronic device.

At S313, the electronic device 100 determines whether or not a user input occurs. Here, the user input denotes all pressures exerted to the electronic device 100 under a user control.

When at S313 a user input occurs, then at S315 the electronic device 100 determines whether or not the occurred user input is an input for changing a user input focus. In other words, the electronic device 100 determines whether the occurred user input is an input for changing the user input focus set in advance by a designer and a user. Here, the input for changing the user input focus set in advance may be set using one of specific button pressing, a release of pressing of a specific button, a touch of a specific pattern, a specific icon touch, specific text input, a specific gesture, a specific direction, an angle within a threshold range, an acceleration within a threshold range, a specific voice command, a pressure within a threshold range, and light intensity within a threshold range, or may be set using a combination of two or more of these non-limiting examples.

When it is determined at S315 that the occurred user input is not an input for changing the user input focus, then the electronic device 100 next performs S321 to process the occurred user input as an input for a specific application being displayed on the external display device to control the external display device. In other words, the electronic device 100 processes the user input detected (or sensed) via the touchscreen 120, the auxiliary input unit 140, and the sensor 150 as an input for a specific application being displayed on the external display device to control an operation of the specific application depending on the user input, and transmits execute images by the control to the external display device to control the relevant execute images to be displayed in real-time on the external display device. At this point, to facilitate the user input for the application being displayed on the external display device, the electronic device 100 may provide an interface for representing mapping relation between each coordinate of the touchscreen 120 and each coordinate of the external display device to each of the touchscreen 120 and the external display device. For example, the electronic device 100 may display an image (ex: a mouse cursor) representing a coordinate of the external display device corresponding to a coordinate of the touchscreen 120 touched by the user. After that, the electronic device 100 re-performs S313 and subsequent steps.

At S317, in the case where at S315 the occurred user input is an input for changing the user input focus, the electronic device 100 changes from the external display device control mode to the display device (the touchscreen 120) control mode of the electronic device 100. Here, in the case where the electronic device 100 continues to display an image, a message, or an icon representing that it is operating in the external display device control mode on the touchscreen 120 while operating in the external display device control mode, the electronic device 100 will not display the image, the message, or the icon from a point of changing to the display device control mode of the electronic device 100. After that, the electronic device 100 re-performs S305 and subsequent steps thereafter.

Though not shown, the operation in which the electronic device 100 detects a user input for changing a user input focus and switches between the display device control mode of the electronic device and the external display device control mode as described above will be performed in this example only while the external display device is connected via a wired line or wirelessly. That is, while the external display device is not connected, the electronic device 100 will not determine whether a user input for changing a user input focus occurs, and operates only in the mode for controlling the display device (the touchscreen 120) of the electronic device 100.

Hereinafter, in the case where a specific input method for changing a user input focus is set, an operation of detecting, at the electronic device, the specific input method and switching between the display device control mode of the electronic device and the external display device control mode is described using an example. In the following description, though a case where the electronic device executes a web browser application to display an execute image of the web browser application on the external display device is exemplarily described for convenience in description, this example is applicable to a case of executing an application of a different kind.

Figure 4:
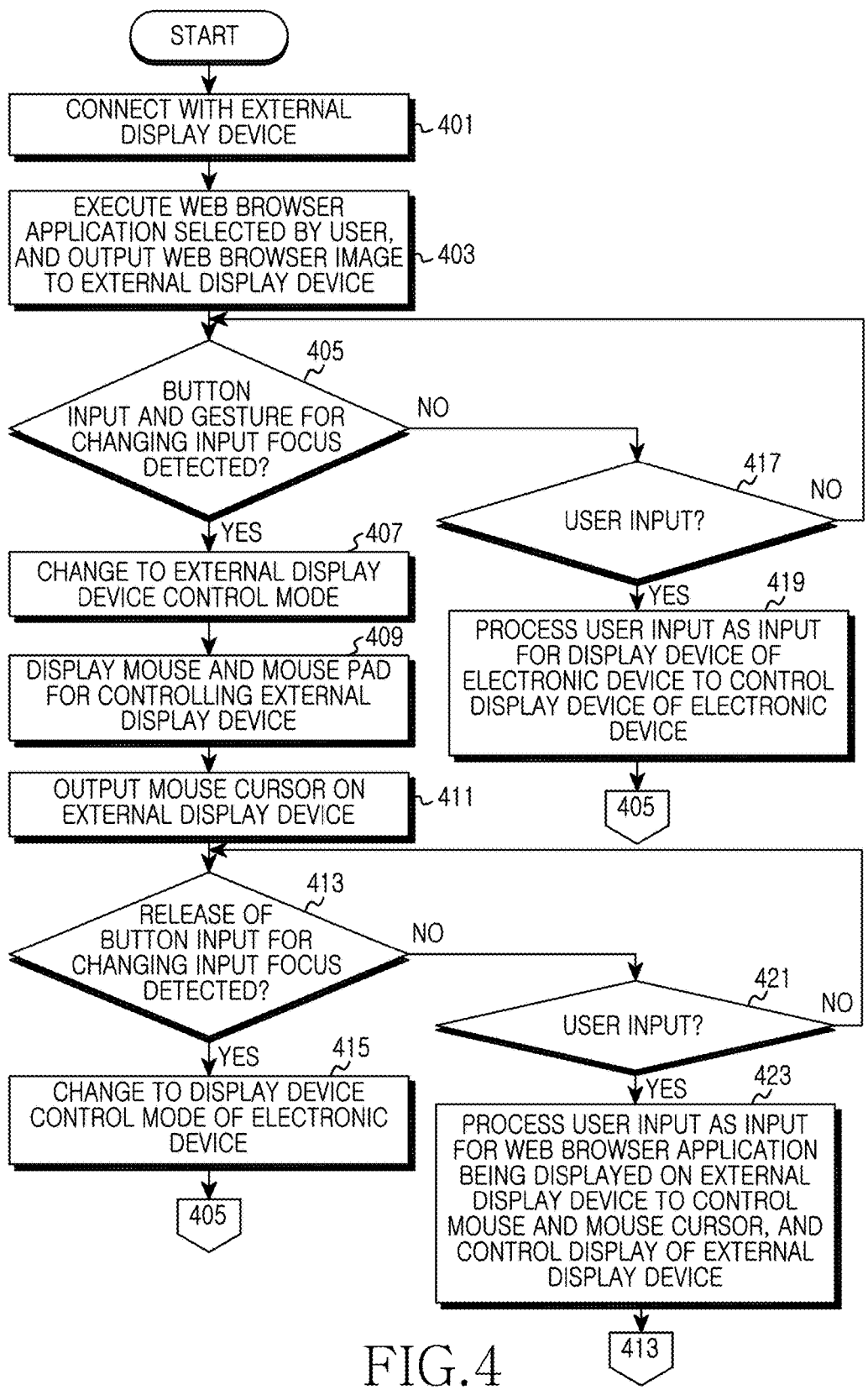
FIG. 4 is a flowchart illustrating exemplary operational procedure for recognizing a button input and a user gesture to change a user input focus in an electronic device according to an exemplary embodiment of the present invention.

FIG. 4 illustrates a procedure for recognizing a button input and/or a user gesture to change a user input focus in an electronic device 100 according to an exemplary embodiment of the present invention.

Referring now to FIG. 4, at S401 the electronic device 100 couples or connects with an external device via a wired line or wirelessly.

At S403, the electronic device executes a web browser application selected under a user control and outputs an execute image of the web browser to an external display device.

Figure 5A:
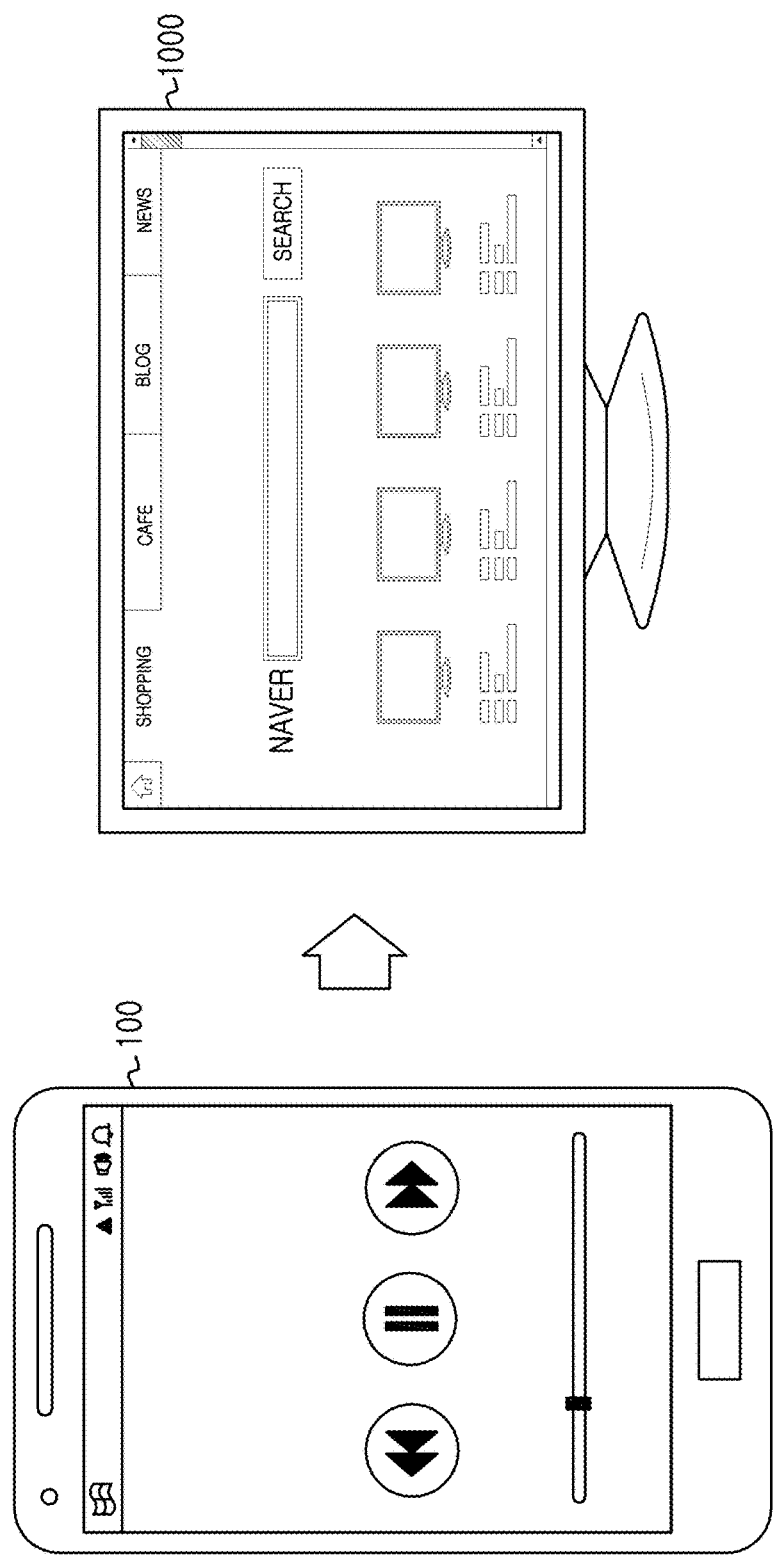

At this point, the electronic device 100 may display the execute image transmitted to the external display device on the touchscreen 120, and may execute a different application to display an execute image of the different application on the touchscreen of the electronic device 100. For example, as illustrated in FIG. 5A, the electronic device 100 may execute a web browser application and a multimedia application to display an execute image of the web browser application via the connected external display device 1000, and display an execute image of the multimedia application on the touchscreen 120 of the electronic device 100.

At S405, the electronic device 100 determines whether a button input and a gesture for changing a user input focus are detected. In other words, as illustrated in FIG. 5B, the electronic device 100 determines whether a touch gesture 503 progressing in a circular shape is detected while a home button 501 set in advance by a user is input.

When at S405 the button input or the gesture for changing a user input focus is not detected, the electronic device 100 next performs S417 to determine whether or not a user input is detected.

The user input in step 417 denotes any and all types of inputs excluding a combination of the home button input and the touch gesture of the circular shape. In the case where the user input does not occur, the electronic device 100 re-performs S405 and the subsequent steps.

In contrast, at S417 in the case where the user input occurs, the electronic device 100 performs S419 to process the user input as an input for the display device (the touchscreen 120) of the electronic device to control the display device of the electronic device 100. For example, as illustrated in FIG. 5A, in the case where a user inputs only a home button while the electronic device 100 is executing a multimedia application, the electronic device 100 may perform a function of "go to home screen" which is a function mapped to the home button in advance to display a home screen image instead of an execute image of the multimedia application.

For another example, as illustrated in FIG. 5A, in the case where the user touches a menu item of "pause" of the multimedia application while the electronic device 100 is executing the multimedia application, the electronic device 100 may temporarily suspend reproduction of the multimedia. After that, the electronic device 100 re-performs S405 and steps subsequent to S405.

In contrast, at S405, in the case where the button input and the gesture for changing the user input focus are detected as a result of the determination, the electronic device 100 next performs S407 to change from the display device (the touchscreen 120) control mode of the electronic device 100 to the external display device control mode.

At S409, the electronic device 100 displays a virtual mouse and a virtual mouse pad in order to represent that it is operating in the external display device control mode on the touchscreen 120 of the electronic device 100.

Figure 5C:
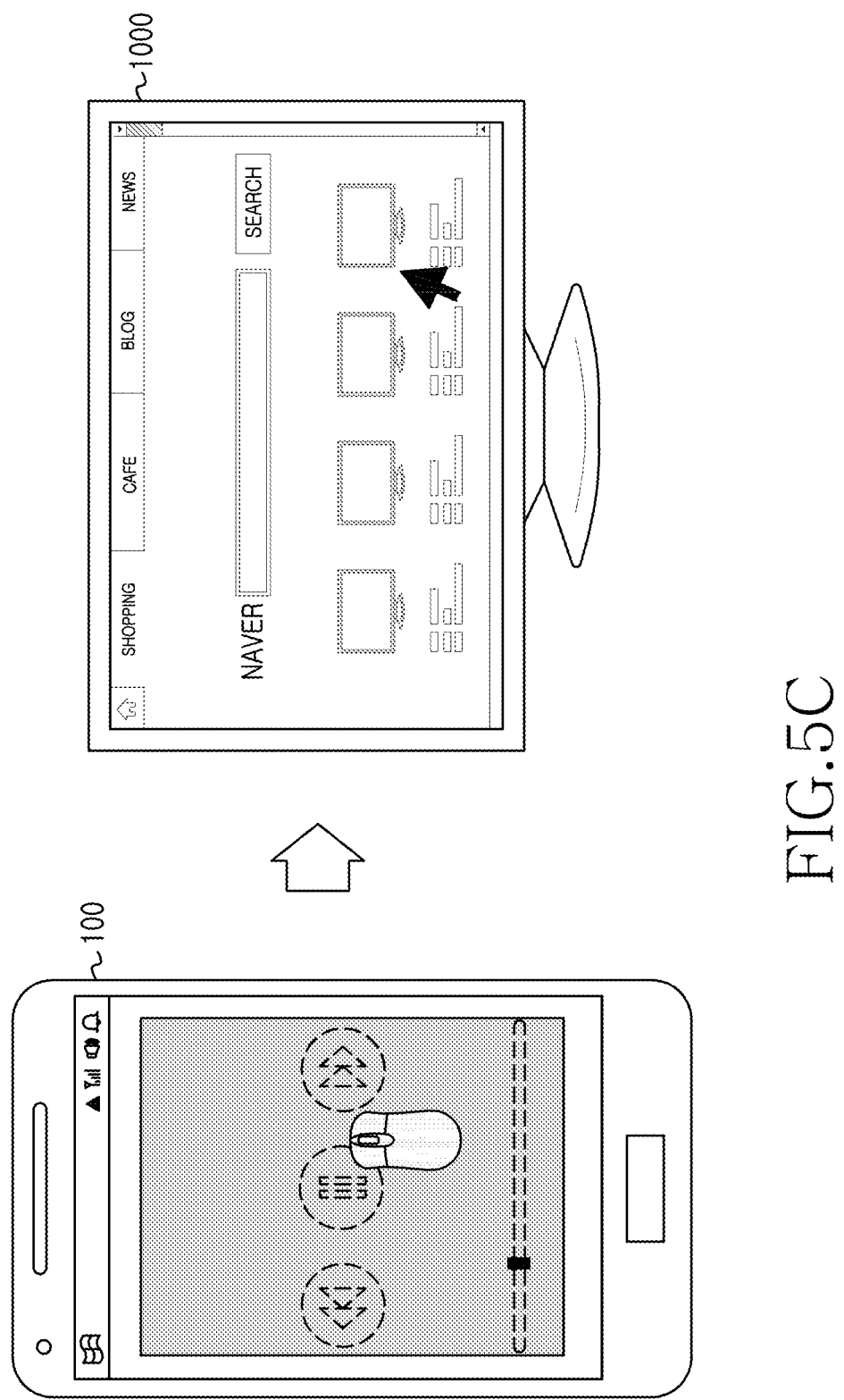

At S411, the electronic device 100 outputs a cursor of the virtual mouse on the external display device. For example, as illustrated in FIG. 5C, the electronic device 100 displays a mouse pad and a mouse on the touchscreen 120 to represent that it is operating as an input unit of the external display device, and displays a virtual mouse cursor whose movement and operation are controlled depending on the movement and touch of the virtual mouse of the touchscreen 120 on the external display device. At this point, the electronic device 100 displays the virtual mouse pad on the execute image of the multimedia application translucently to allow a user to recognize that the electronic device 100 is displaying the execute image of the multimedia application.

At S413, the electronic device 100 determines whether or not a button input release for changing a user input focus is detected. In other words, the electronic device 100 assumes that the input of the home button detected in S405 is not released during performance of S407, S409 and S411.

However, at S405, in the case where the input of the home button detected is released before the electronic device performs A407 through S411, the electronic device 100 immediately re-performs S405 to determine whether or not a button input and a gesture are detected and perform subsequent steps.

Figure 5D:
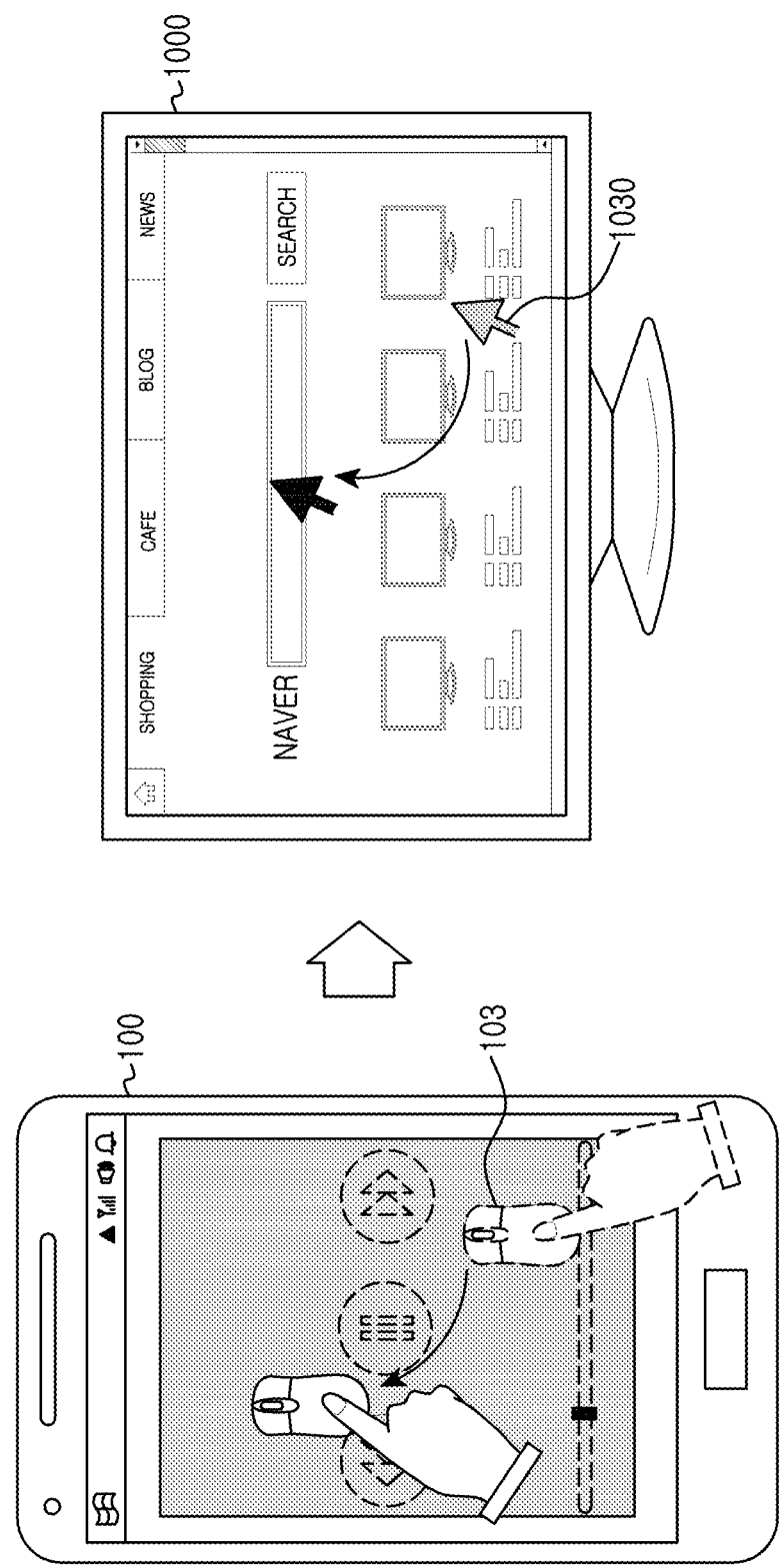

When, at S413, the button input release for changing the user input focus is not detected, then at S421 the electronic device 100 determines whether or not a user input occurs. At S421 the user input may denote all types of inputs excluding the home button input release for changing the user input focus. When the user input occurs, the electronic device 100 next performs S423 to process the occurred user input as an input for a web browser application being displayed on the external display device to control the movement and operation of the virtual mouse and the virtual mouse cursor, and control display of the external display device. For example, as illustrated in FIG. 5D, in the case where a user touches the virtual mouse displayed on the electronic device 100 to drag the virtual mouse 103 to a different position, the electronic device 100 may move and display the virtual mouse according to the drag position, and determine a movement coordinate of the virtual mouse cursor 1030 being output on the external display device 1000 according to the drag and the virtual mouse movement coordinate to move and display the virtual mouse cursor. At this point, in the case where the user touches a left button of the virtual mouse displayed on the electronic device 100, the electronic device 100 may perform an operation of selecting contents or an item indicated by the virtual mouse cursor among contents and items included in the web browser of the external display device. After that, the electronic device 100 re-performs S413 and steps subsequent to S413.

In contrast, when at S413 the button input release for changing the user input focus is detected, the electronic device 100 performs S415 to change from the external display device control mode to the display device (the touchscreen 120) control mode of the electronic device 100, and re-preforms S405 steps subsequent to S405.

For example, as illustrated in FIG. 5E, in the case where an input of the home button 501 being continuously input while the electronic device 100 is operating in the external display device control mode is released, the electronic device 100 changes to the display device (the touchscreen 120) control mode of the electronic device 100. While operating in the display device (the touchscreen 120) control mode of the electronic device 100, the electronic device 100 does not display the virtual mouse and the virtual mouse pad on the touchscreen 120 and does not display the virtual mouse cursor on the external display device as illustrated in FIG. 5A.

Figure 6:
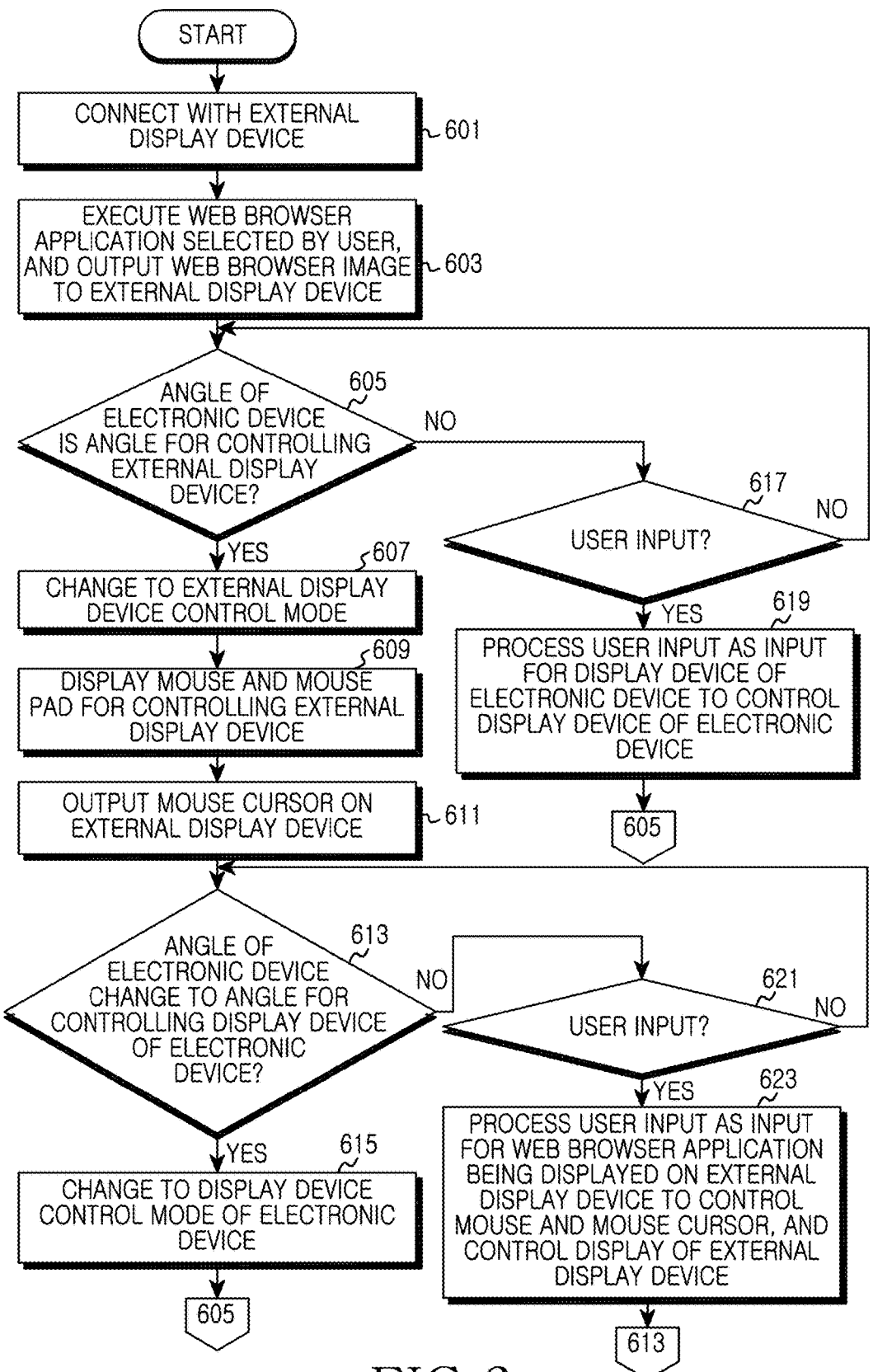
FIG. 6 is a flowchart illustrating exemplary operational procedure for changing a user input focus depending on an angle in an electronic device according to an exemplary embodiment of the present invention.

FIG. 6 illustrates a flowchart showing exemplary operational procedure for changing a user input focus depending on an angle in an electronic device 100 according to an exemplary embodiment of the present invention.

Referring now to FIG. 6, at S601 the electronic device 100 couples/connects with an external device via a wired line or wirelessly.

Figure 7A:
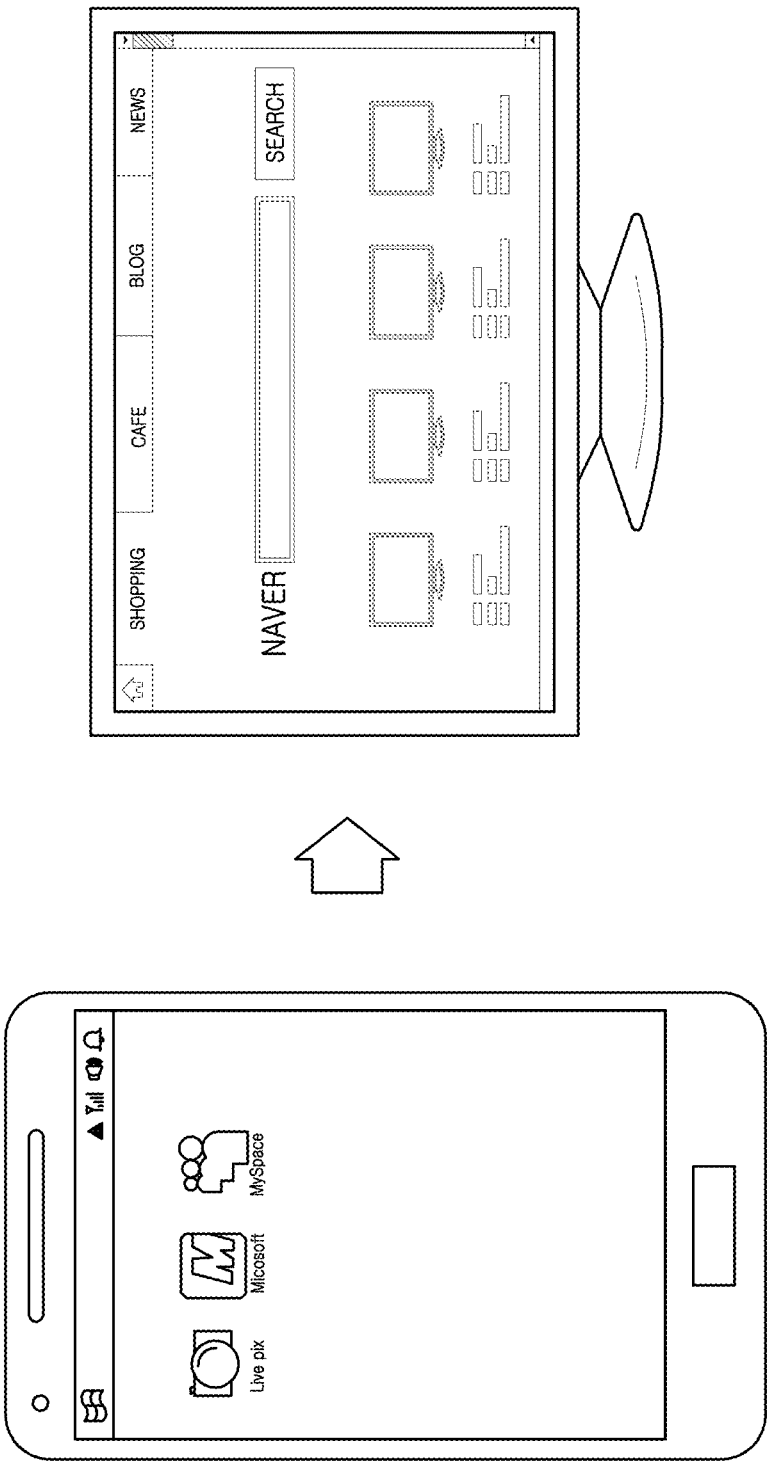
FIGS. 7A, 7B, 7C, 7D and 7E are various views illustrating a screen configuration for changing a user input focus depending on an angle in an electronic device according to an exemplary embodiment of the present invention.

At S603, the electronic device 100 executes a web browser application selected under user control to output an execute image of the web browser to an external display device. At this point, the electronic device 100 may display the execute image transmitted to the external display device on the touchscreen 120, and may execute a different application to display an execute image of the different application on the touchscreen 120 of the electronic device 100. Also, the electronic device 100 does not execute a separate application but may display a home screen (or a basic interface). For example, as illustrated in FIG. 7A, the electronic device 100 may execute a web browser application to display an execute image of the web browser application via the connected external display device, and display a home screen including at least one application item via the touchscreen 120 of the electronic device 100.

Figure 7B:
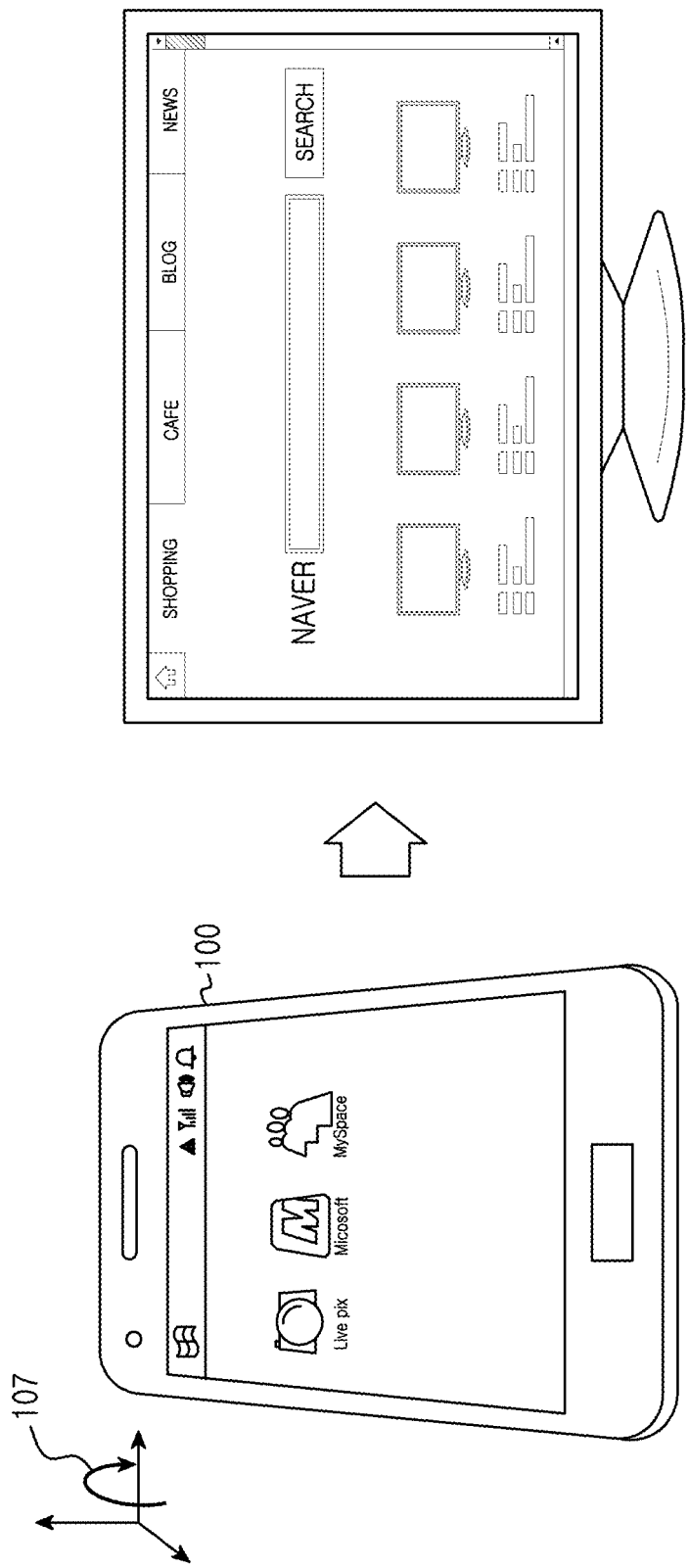

At S605, the electronic device 100 determines whether an angle (for a slope) of the electronic device 100 comprises an angle within a predetermined threshold or predetermined range for controlling the external display device. For example, in the case where the angle for controlling the external display device is set to an angle 107 between 75 degrees to 105 degrees and an angle for controlling the display device of the electronic device 100 is set to an angle excluding angles between 75 degrees and 105 degrees, the electronic device 100 determines whether the angle 107 of the electronic device 100 is tilted an angle between 75 degree and 105 degree from x-axis as illustrated in FIG. 7B.

When the angle of the electronic device 100 is not an angle for controlling the external display device, the electronic device 100 next performs S617 to determine whether or not a user input is detected. The user input at S617 denotes any and all types of inputs excluding an angle. When the user input does not occur, the electronic device 100 re-performs S605 steps subsequent to S605.

In contrast, when the user input occurs, the electronic device 100 performs S619 to process the user input as an input for the display device (the touchscreen 120) of the electronic device to control the display device of the electronic device 100. For example, as illustrated in FIG. 7A, in the case where a user touches a specific application item displayed on the home screen while the electronic device 100 is displaying the home screen, the electronic device 100 may execute the touched specific application to display an execute image of the specific application on the touchscreen 120. After that, the electronic device 100 re-performs S605 and re-performs steps subsequent to S605.

In contrast, when at S605 the angle of the electronic device 100 is the angle for controlling the external display device as a result of the determination, the electronic device 100 next performs S607 to change from the display device (the touchscreen 120) control mode of the electronic device 100 to the external display device control mode.

At S609, the electronic device S100 displays a virtual mouse and a virtual mouse pad in order to represent that the electronic device 100 is operating in the external display device control mode on the touchscreen 120 of the electronic device.

Figure 7C:
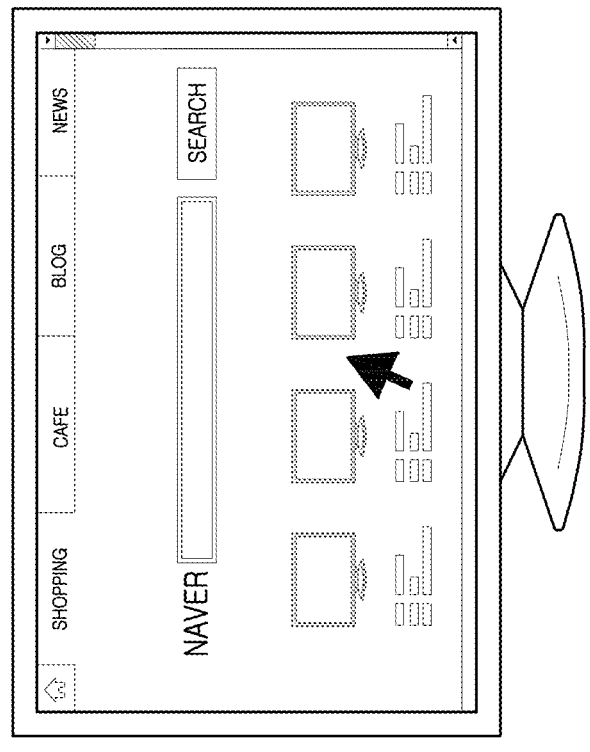
Figure 7C:
Figure 7C:
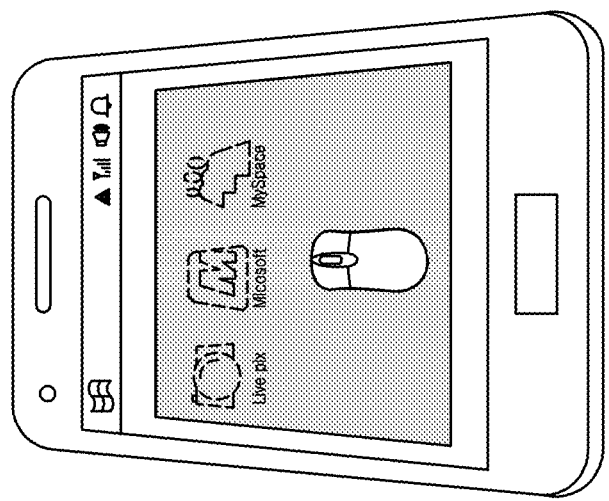

At S611, the electronic device 100 outputs a cursor of the virtual mouse on the external display device. For example, as illustrated in FIG. 7C, the electronic device 100 displays the virtual mouse pad and the virtual mouse on the touchscreen 120 to represent that the electronic device 100 is operating as an input unit of the external display device, and displays the virtual mouse cursor whose movement and operation are controlled according to the virtual mouse movement and touch of the touchscreen 120 on the external display device. At this point, the electronic device 100 displays the virtual mouse pad translucently on the home screen to allow a user to recognize that the electronic device 100 is displaying the home screen.

At S613, the electronic device 100 determines whether an angle of the electronic device 100 changes to an angle for controlling the display device of the electronic device 100. In other words, the electronic device 100 assumes that the angle of the electronic device 100 detected at S605 is maintained as an angle for controlling the external display device during S607, S609, and S611. In the case where the angle of the electronic device 100 deviates from an angle range for controlling the external display device before the electronic device 100 performs S607 through S611, the electronic device 100 immediately re-performs S605 to determine whether or not the angle of the electronic device 100 is at the angle for controlling the external display device to perform subsequent steps.

Figure 7D:
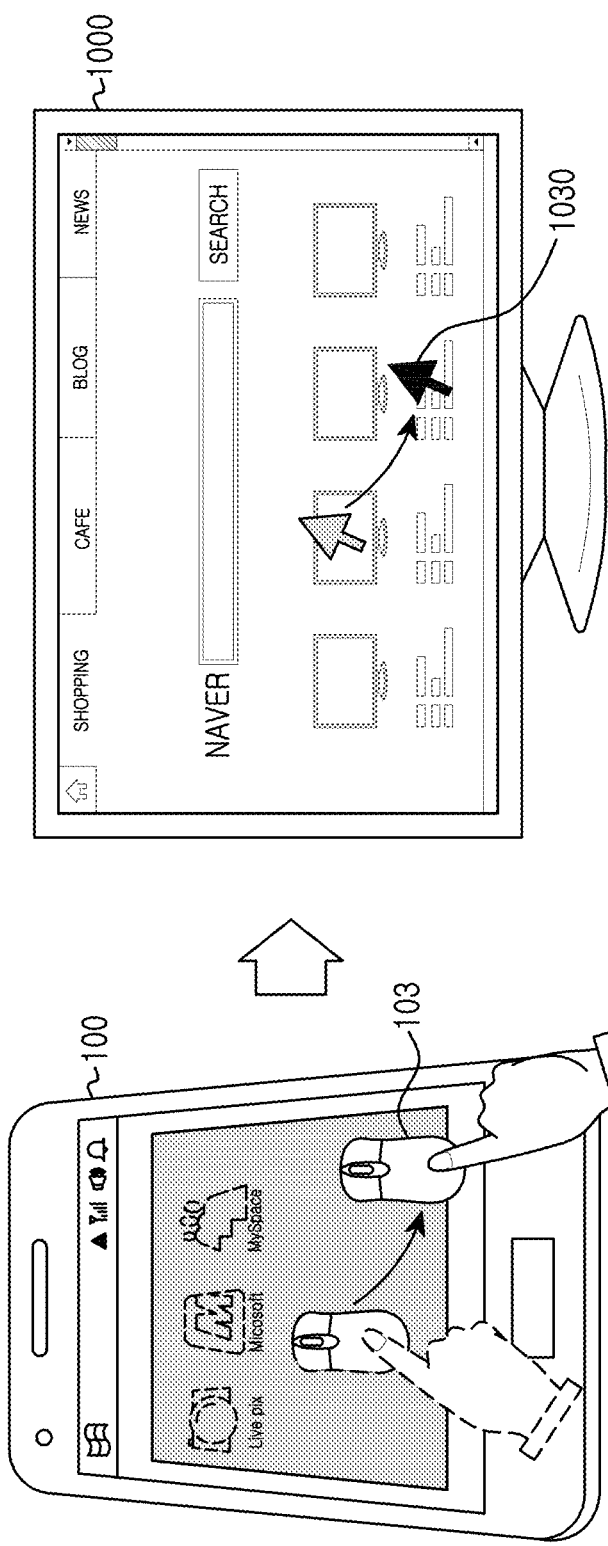

When the angle at which the electronic device 100 is oriented does not change to the angle for controlling the display device of the electronic device 100, the electronic device 100 performs S621 to determine whether a user input occurs. The user input at S621 may denote all types of inputs excluding the angle of the electronic device 100. When the user input occurs, the electronic device 100 next performs S623 to process the occurred user input as an input for a web browser application being displayed on the external display device to control the movement and operation of the virtual mouse and the virtual mouse cursor, and controls the display of the external display device. For example, as illustrated in FIG. 7D, in the case where a user touches the virtual mouse 103 displayed on the electronic device 100 to drag the virtual mouse to a different position, the electronic device 100 may move and display the virtual mouse according to a drag position, and determine the movement coordinates of the virtual mouse cursor 1030 being output on the external display device 1000 according to the drag and the movement coordinates of the virtual mouse to move and display the virtual mouse cursor. At this point, in the case where the user touches a left button of the virtual mouse displayed on the electronic device 100, the electronic device 100 may perform an operation of selecting contents or an item indicated by the virtual mouse cursor among contents and items included in the web browser of the external display device. After that, the electronic device 100 re-performs S613 steps subsequent to S613.

Figure 7E:
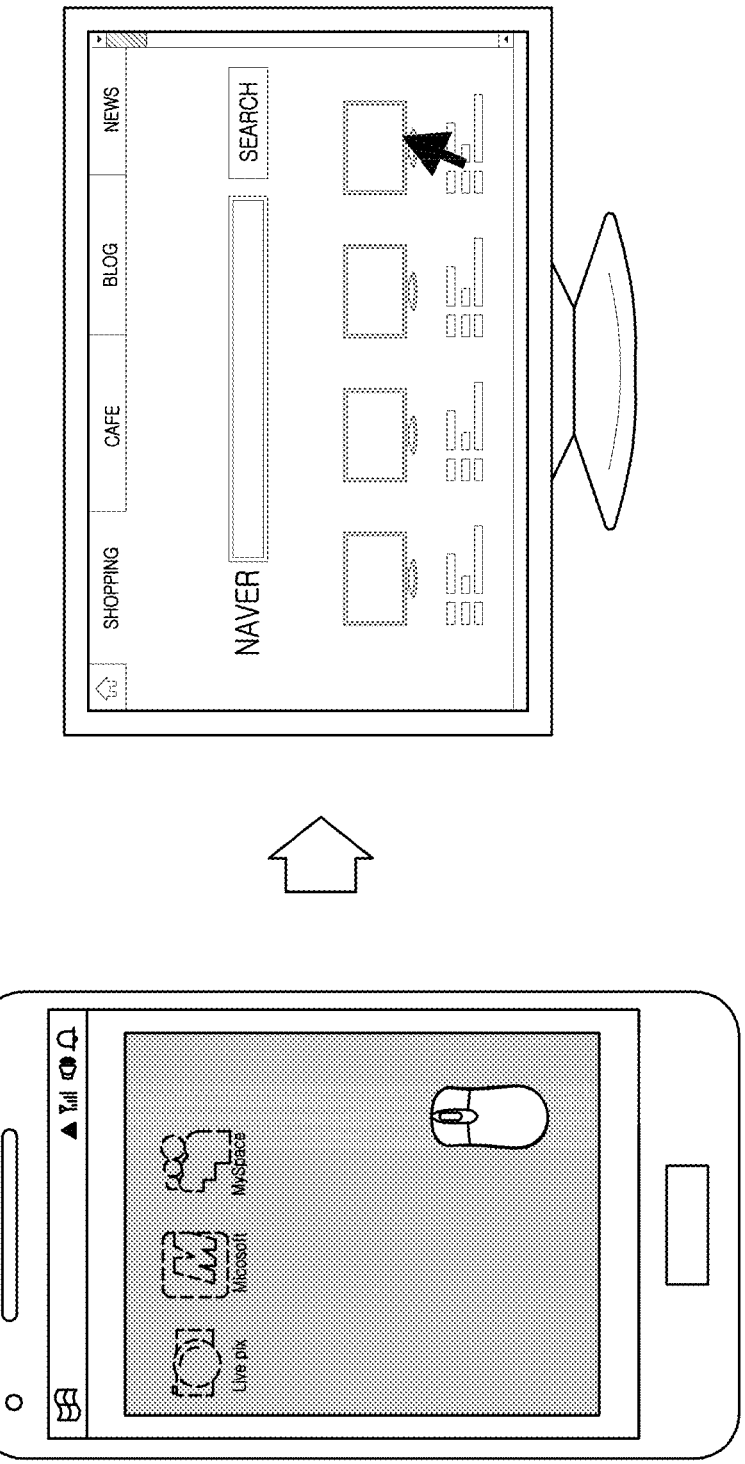

In contrast, when it is determined at S613 that the angle of the electronic device 100 at which it is oriented changes to the angle for controlling the display device of the electronic device 100, the electronic device 100 performs S615 to change from the external display device control mode to the display device (the touchscreen 120) control mode of the electronic device 100, and re-performs S605 and subsequent steps. For example, as illustrated in FIG. 7E, in the case where the angle of the electronic device 100 deviates from an angle range between 75 degree and 105 degree for controlling the external display device, the electronic device 100 changes to the display device (the touchscreen 120) control mode of the electronic device 100. While operating in the display device (the touchscreen 120) control mode of the electronic device 100, the electronic device 100 does not display the virtual mouse and the virtual mouse pad on the touchscreen 120 and does not display the virtual mouse cursor on the external display device as illustrated in FIG. 7A.

Figure 8:
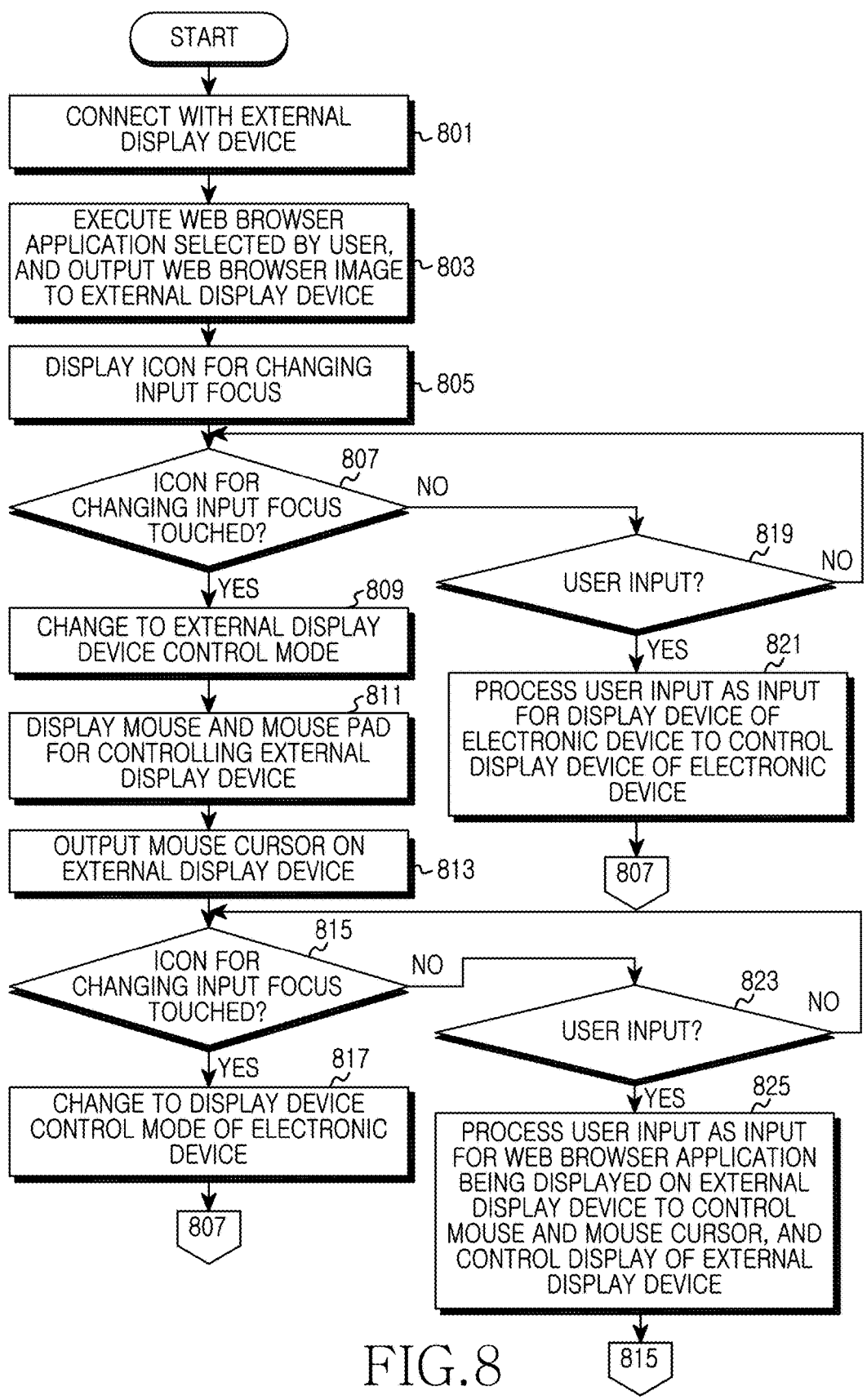
FIG. 8 is a flowchart illustrating exemplary operational procedure for changing a user input focus using a user interface in an electronic device according to an exemplary embodiment of the present invention.

FIG. 8 is a flowchart that illustrates exemplary operational procedure for changing a user input focus using a user interface in an electronic device 100 according to another exemplary embodiment of the present invention.

Referring now to FIG. 8, at S801 the electronic device 100 couples/connects with an external device via a wired line or wirelessly.

At S803, the electronic device 100 executes a web browser application selected under user control to output an execute image of the web browser to an external display device. At this point, the electronic device 100 may display the execute image transmitted to the external display device on the touchscreen 120, and may execute a different application to display an execute image of the different application on the touchscreen 120 of the electronic device 100.

For example, as illustrated in FIG. 5A, the electronic device 100 may execute a web browser application and an image viewer application to display an execute image of the web browser application via the connected external display device, and display an execute image of the image viewer application via the touchscreen 120 of the electronic device 100.

Figure 9A:
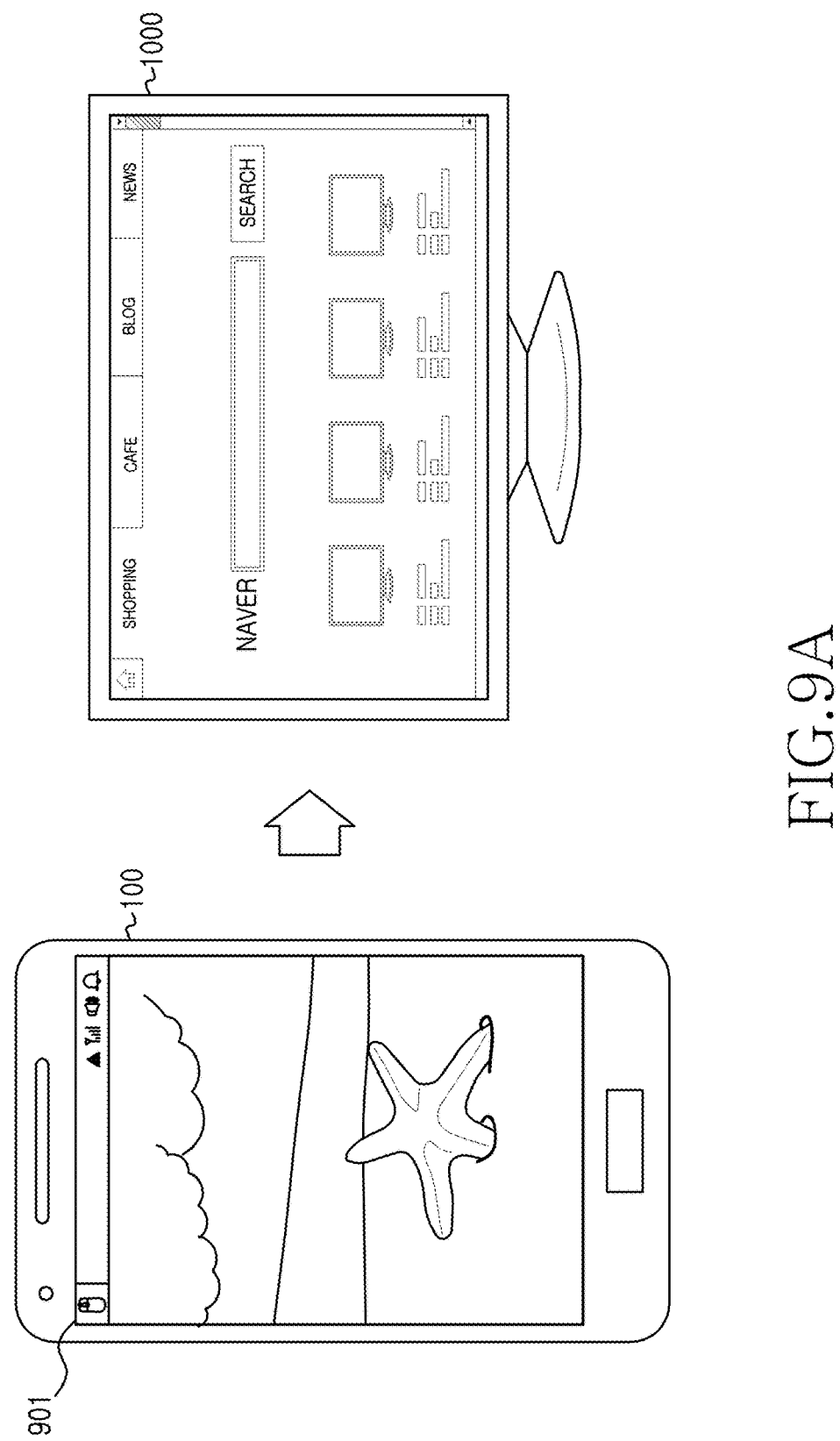
FIGS. 9A, 9B and 9C are views illustrating a screen configuration for changing a user input focus using a user interface in an electronic device according to an exemplary embodiment of the present invention.

At S805, the electronic device 100 displays an icon for changing an input focus on the touchscreen of the electronic device 100. Here, the electronic device 100 may display the icon for changing the input focus only while the external display device is connected. For example, as illustrated in FIG. 9A, the electronic device 100 may display an icon 901 of a mouse shape on a predetermined region of the screen.

At S807, the electronic device 100 determines whether or not the icon for changing a user input focus is touched. In other words, the electronic device 100 determines whether the icon 901 displayed on the predetermined region of the screen illustrated in FIG. 9A is touched.

When at S807 the icon for changing the user input focus is not touched, the electronic device 100 performs S819 to determine whether a user input is detected. The user input at S819 denotes all types of inputs excluding the icon touch for changing the user input focus.

When at S819 the user input does not occur, the electronic device 100 re-performs S807 and steps subsequent to S807.

In contrast, when at S819 the user input occurs, the electronic device 100 performs S821 to process the user input as an input for the display device (the touchscreen 120) of the electronic device to control the display device of the electronic device 100. For example, as illustrated in FIG. 9A, in the case where a user touches a region of a photo image while the electronic device 100 executes an image viewer application and displays the photo image, the electronic device 100 may display information related to the corresponding photo image. After that, the electronic device 100 re-performs S807 steps subsequent to S807.

In contrast, when at S807 the icon for changing the user input focus is touched, the electronic device 100 performs S809 to change from the display device (the touchscreen 120) control mode of the electronic device 100 to the external display device control mode.

At S811, the electronic device 100 displays a virtual mouse and a virtual mouse pad in order to represent that the electronic device 100 is operating in the external display device control mode on the touchscreen 120 of the electronic device 100.

Figure 9B:
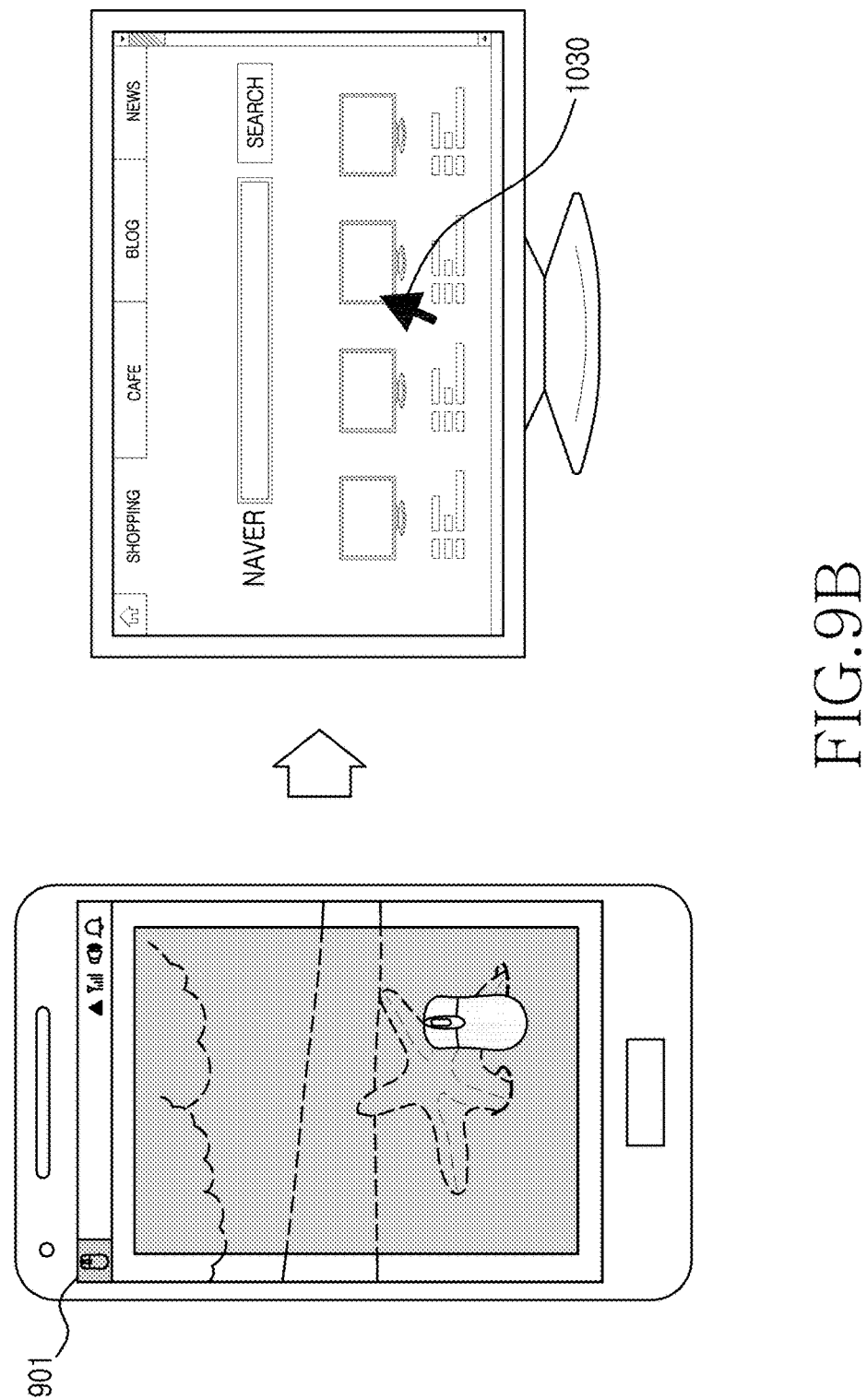

At S813, the electronic device outputs a cursor of the virtual mouse on the external display device. For example, as illustrated in FIG. 9B, the electronic device 100 displays the virtual mouse pad and the virtual mouse on the touchscreen 120 to represent that the electronic device 100 is operating as an input unit of the external display device 1000, and displays the virtual mouse cursor 1030 whose movement and operation is controlled according to the virtual mouse movement and touch of the touchscreen 120 on the external display device 1000. At this point, the electronic device 100 displays the virtual mouse pad on the photo image translucently to allow a user to recognize that the electronic device 100 is displaying the photo image. Also, to represent that the electronic device 100 is operating in the external display device control mode, the electronic device 100 may change color, a shape, a size, an image, a boundary line thickness, and brightness of the icon for changing the user input focus to display that the icon is activated.

After that, the electronic device 100 performs S815 to determine whether the icon for changing the user input focus is touched again. In other words, the electronic device 100 assumes that the icon touched in S807 is activated during S809, S811 and S813.

In the case where at S807 the icon for changing the user input focus is touched again and inactivated before the electronic device 100 performs S809 through S813, the electronic device 100 immediately re-performs S807 to determine whether the inactivated icon for changing the user input focus is touched and perform subsequent steps. In other words, the icon for changing the user input focus according to an embodiment of the present invention may repeat an active state and an inactive state depending on the user's touch, and the active state and the inactive state may be represented by controlling the color, the shape, the size, the image, the boundary line thickness, and the brightness of the icon.

Figure 9C:
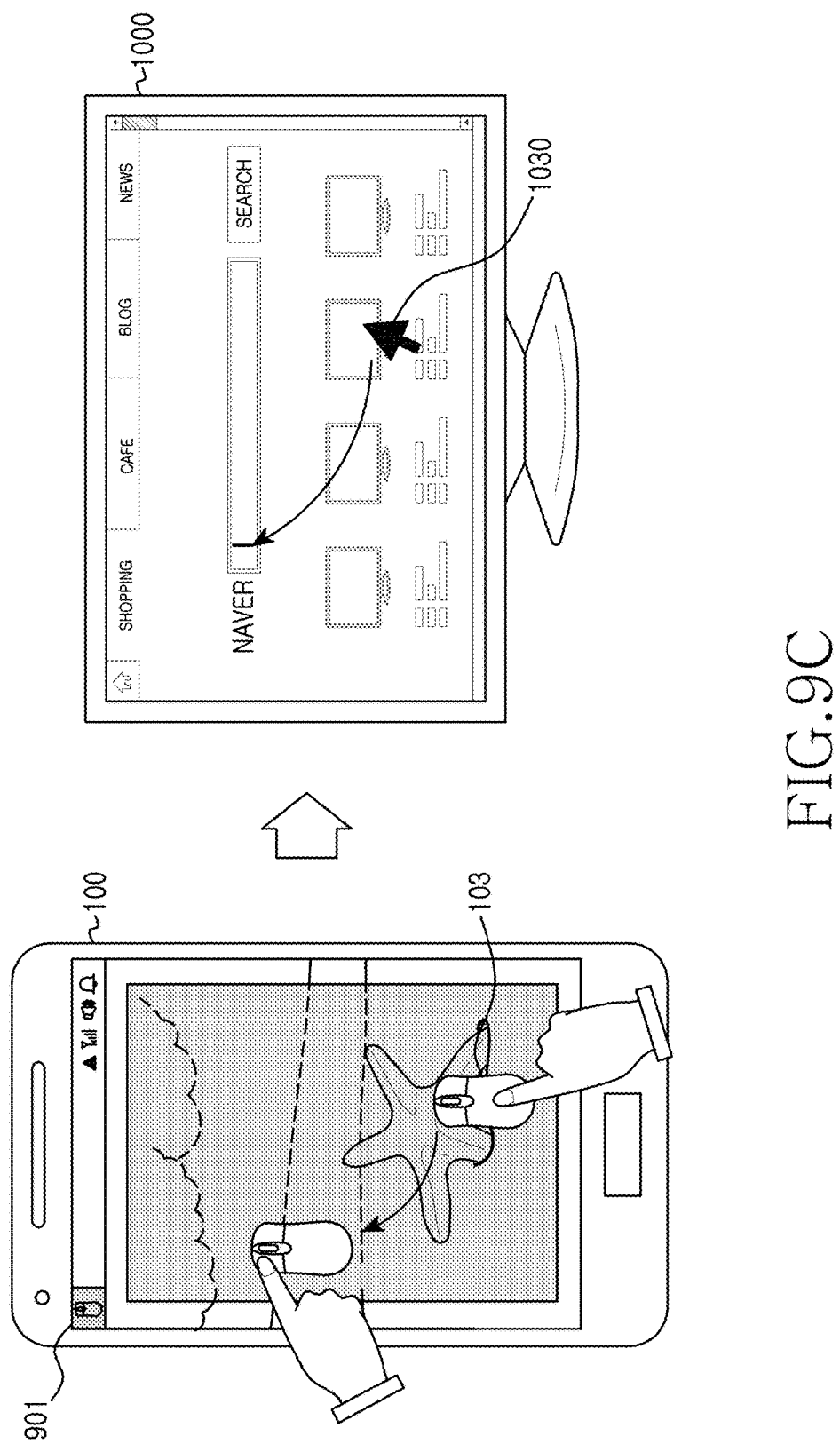

When at S815 the icon for changing the user input focus is not touched, the electronic device 100 next performs S823 to determine whether a user input occurs. The user input at S823 may denote all types of inputs excluding the icon touch for changing the user input focus. When the user input occurs, the electronic device 100 proceeds S825 to process the user input as an input for a web browser application being displayed on the external display device to control the movement and operation of the virtual mouse and the virtual mouse cursor, and control display of the external display device. For example, as illustrated in FIG. 9C, in the case where a user touches the virtual mouse 103 displayed on the electronic device 100 and drags the virtual mouse to a different position, the electronic device 100 may move and display the virtual mouse according to a drag position, and determine the movement coordinates of the virtual mouse cursor 1030 being output on the external display device 1000 according to the drag and the movement coordinates of the virtual mouse 103 to move and display the virtual mouse cursor 1030. At this point, in the case where the user touches a left button of the virtual mouse 103 displayed on the electronic device 100, the electronic device 100 may perform an operation of selecting contents or an item indicated by the virtual mouse cursor among contents and items included in the web browser of the external display device. At this point, in the case where a position indicated by the virtual mouse cursor in the web browser of the external display device is a text input window, the electronic device 100 may change the shape of the virtual mouse cursor displayed on the web browser of the external display device. After that, the electronic device 100 re-performs S815 and subsequent steps.

In contrast, at S815 in the case where the icon for changing the user input focus is input, the electronic device 100 performs S817 to change from the external display device control mode to the display device (the touchscreen 120) control mode of the electronic device 100, and re-performs S807 and subsequent steps.

For example, as illustrated in FIG. 9C, in the case where the icon 901 maintaining an activate state is touched while the electronic device 100 is operating in the external display device control mode, the electronic device 100 changes to the display device (the touchscreen 120) control mode of the electronic device 100. While operating in the display device (the touchscreen 120) control mode of the electronic device 100, the electronic device 100 changes the icon 901 to an inactive state on the touchscreen 120, and does not display the virtual mouse and the virtual mouse pad, and does not display the virtual mouse cursor 1030 on the external display device 1000 as illustrated in FIG. 9A.

Although the above-description has been made to an operation of sensing or detecting, at the electronic device, a home button and a specific gesture, an angle of the electronic device, and a touch of a displayed icon, and switching between the display device control mode and the external display device control mode using an example, the present invention is applicable to a case of sensing or detecting a different type of a user input, and switching between the display device control mode and the external display device control mode. For example, the present invention may detect a home button input and a multi-touch to switch a mode, detect an arbitrary key button input and a double touch to switch a mode, detect only a touch of a predetermined pattern to switch a mode, detect a pressure exerted on the electronic device and a multi-touch to switch a mode, and detect an angle of the electronic device and an arbitrary key button input to switch a mode.

According to the present invention, an electronic device has an effect of easily controlling the display screen of an external display device via a user input for the electronic device by detecting an event for changing a user input focus when displaying an image via an external display device to switch from a display screen control mode of the electronic device to a display screen control mode of the external display device. Furthermore, the electronic device changes the user input focus via a user gesture, a key input, and various sensors, so that even a user who is not accustomed to use of the electronic device can easily use the electronic device.

The singular form described in the content of specification and claims includes the plural form unless specifically described. Particularly, in the case where an indefinite article is used, it is considered that it includes the singular and the plural.

A shape, a number, a characteristic, a group, etc. described in relation to a specific embodiment of the present invention are usable in other exemplary embodiments unless they are incompatible.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The terms "unit" or "module" referred to herein is to be understood as constituting hardware such as a processor or microprocessor configured for a certain desired functionality, or a non-transitory medium comprising machine executable code, in accordance with statutory subject matter under 35 U.S.C. §101 and does not constitute software per se.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method in an electronic device, the method comprising:
   in response to a connection between the electronic device and an external display device, displaying a first contents on a first display of the electronic device and a second contents on a second display of the external display device;
   in response to detecting an input event while displaying the first and second contents, entering a mode for switching an input focus;

after entering the mode, in response to a touch input on at least region in part of the first display that the first contents is displayed, controlling the second contents based on the touch input without controlling the first contents; and when the mode is ended, in response to a touch input on at least region in part of the first display that the first contents is displayed, controlling the first contents based on the touch input without controlling the second contents.

2. The method of claim 1, wherein the input event for switching the input focus is detected by at least one of a touchscreen, an auxiliary input unit, and a sensor of the electronic device, and wherein when the input event is detected by the sensor, the input focus is switched in response to the input event including tilting of the electronic device greater than a predetermined threshold.

3. The method of claim 1, wherein controlling the second contents based on the touch input in the mode comprises:

modifying the second contents based on the touch input; and transmitting the modified second contents to the external display device.

4. The method of claim 1, wherein controlling the second contents based on the touch input in the mode comprises:

determining a pointing input associated with a coordinate based on the touch input; and displaying a pointing object on the displayed second contents according to the determined pointing input.

5. The method of claim 4, further comprising:

providing a virtual pad for receiving the touch input on the first display in the mode, wherein the virtual pad is transparently positioned over at least in part of the display first contents.

6. The method of claim 5, further comprising:

displaying a mouse image on the virtual pad; and moving the mouse image based on the touch input.

7. The method of claim 6, wherein the mouse image includes a button, and further comprising:

in response to detecting a second touch input on the mouse image for selecting the button, selecting an item of the second contents where the pointing object is placed to change the second contents according to the selected item.

8. The method of claim 1, wherein the input event for switching the input focus comprises at least one of a predetermined button input, a predetermined pattern touch, a predetermined icon touch, a predetermined text input, a predetermined gesture, a tilting of the electronic device compared to a predetermined threshold, an acceleration within a predetermined threshold range, a predetermined direction, a pressure within a threshold range, a predetermined spoken command, or a light intensity within a threshold range.

9. The method of claim 1, further comprising, detecting whether tilting of the electronic device is maintained within a predetermined threshold;

when the tilting is maintained within the predetermined threshold, maintaining the switched input focus; and when the tilting deviates from the predetermined threshold, reverting the input focus such that inputs to the first display control the first display.

10. An electronic device comprising:

a communication unit comprising a transceiver for connecting the electronic device with an external display device including a second display;

a first display including a touchscreen;

at least one processor;

a non-transitory memory; and at least one program comprised of machine executable code stored in the memory and executed by the at least one processor to:

in response to a connection between the electronic device and the external display device, display a first contents on first display and a second contents on the second display of the external display device, in response to detecting an input event while displaying the first and second contents, enter a mode for switching an input focus, after entering the mode, in response to a touch input on at least region in part of the first display that the first contents is displayed, control the second contents based on the touch input without controlling the first contents, and when the mode is ended, in response to a touch input on at least region in part of the first display that the first contents is displayed, control the first contents based on the touch input without controlling the second contents.

11. The electronic device of claim 10, further comprising an auxiliary input unit and a sensor, wherein the input event for switching the input focus comprises an event detectable using at least one of the touchscreen, the auxiliary input unit, and the sensor of the electronic device, and wherein when the input event is detected by the sensor, the input focus is switched in response to the input event including tilting of the electronic device greater than a predetermined threshold.

12. The electronic device of claim 10, wherein, when controlling the second contents based on the touch input in the mode, the program is executable by the processor to:

modify the second contents based on the touch input, and transmit the modified second contents to the external display device.

13. The electronic device of claim 10, wherein, controlling the second contents based on the touch input in the mode, the program comprises is executable by the processor to:

determine a pointing input associated with a coordinate based on the touch input in the mode, and display a pointing object on the displayed second contents according to the determined pointing input.

14. The electronic device of claim 13, wherein the program comprises is further executable by the processor to:

provide a virtual pad for receiving the touch input on the first display in the mode, wherein the virtual pad is transparently positioned over at least in part of the display first contents.

15. The electronic device of claim 14, wherein the program comprises is further executable by the processor to:

display a mouse image on the virtual pad, and move the mouse image based on the touch input.

16. The electronic device of claim 15, wherein the mouse image includes a button, and wherein the program comprises is further executable by the processor to:

in response to detecting a second touch input on the mouse image for selecting the button, select an item of the second contents where the pointing object is placed to change the second contents according to the selected item.

17. The electronic device of claim 10, wherein the input event for switching the input focus comprises at least one of a predetermined button input, a predetermined pattern touch, a predetermined icon touch, a predetermined text input, a predetermined gesture, a tilting of the electronic device compared to a predetermined threshold, an acceleration within a predetermined threshold range, a predetermined direction, a pressure within a threshold range, a predetermined spoken command, or a light intensity within a threshold range.

18. The electronic device of claim 10, wherein the program is further executable by the processor to:
   detect whether tilting of the electronic device is maintained within a predetermined threshold;
   when the tilting is maintained within the predetermined threshold, maintain the switched input focus; and
   when the tilting deviates from the predetermined threshold, revert the input focus such that inputs to the first display control the first display.

* * * * *